United States Patent [19]

Yasuda

[11] Patent Number: 5,097,587
[45] Date of Patent: Mar. 24, 1992

[54] NUMERICALLY CONTROLLED MACHINE TOOL WITH AUTOMATIC TOOL EXCHANGE DEVICE AND INDEXING DEVICE

[75] Inventor: Shoki Yasuda, Nagoya, Japan

[73] Assignee: Brother Kogyo Kabushiki Kaisha, Japan

[21] Appl. No.: 577,256

[22] Filed: Sep. 4, 1990

[30] Foreign Application Priority Data

Sep. 4, 1989 [JP] Japan .................................. 1-228646
Sep. 4, 1989 [JP] Japan .................................. 1-228647

[51] Int. Cl.$^5$ .......................................... B23Q 3/157
[52] U.S. Cl. .............................. 29/568; 364/474.21
[58] Field of Search ........................... 29/568, 26 A; 364/474.21, 474.26

[56] References Cited

U.S. PATENT DOCUMENTS

| | | | |
|---|---|---|---|
| 3,492,467 | 1/1970 | Caban et al. | 29/568 X |
| 3,587,360 | 6/1971 | Oxenham | 29/568 X |
| 4,513,366 | 4/1985 | Munekata et al. | 364/474.26 |
| 4,752,885 | 6/1988 | Kawakami et al. | 29/568 |
| 4,833,772 | 5/1989 | Kobayashi et al. | 29/568 |

FOREIGN PATENT DOCUMENTS

| | | | |
|---|---|---|---|
| 54047 | 3/1982 | Japan | 29/568 |
| 126046 | 7/1983 | Japan | 364/474.21 |
| 86153 | 5/1986 | Japan | 29/568 |
| 63-123646 | 5/1988 | Japan . | |
| 311408 | 12/1988 | Japan | 364/474.21 |

Primary Examiner—William Briggs
Attorney, Agent, or Firm—Oliff & Berridge

[57] ABSTRACT

The numerically controlled machine tool provided with an automatic tool exchange device and a work indexing device. After the spindle head completely retreats, the preparation for the next tool, the exchange of the tools or the change of the machined surface are carried out. Since the interference region at the time of the change of the machined surface is determined, the tools can be exchanged closest to the work but without interfering with the work. The indirect operation time required for the exchange of the tools and the change of the machined surface can be minimized. When the work has multiple surfaces to machine, the work can be rotated minimum angle in a predetermined direction without interfering with the peripheral device by the indexing device to change the machined surface. The operator can confirm the direction on the display.

16 Claims, 17 Drawing Sheets

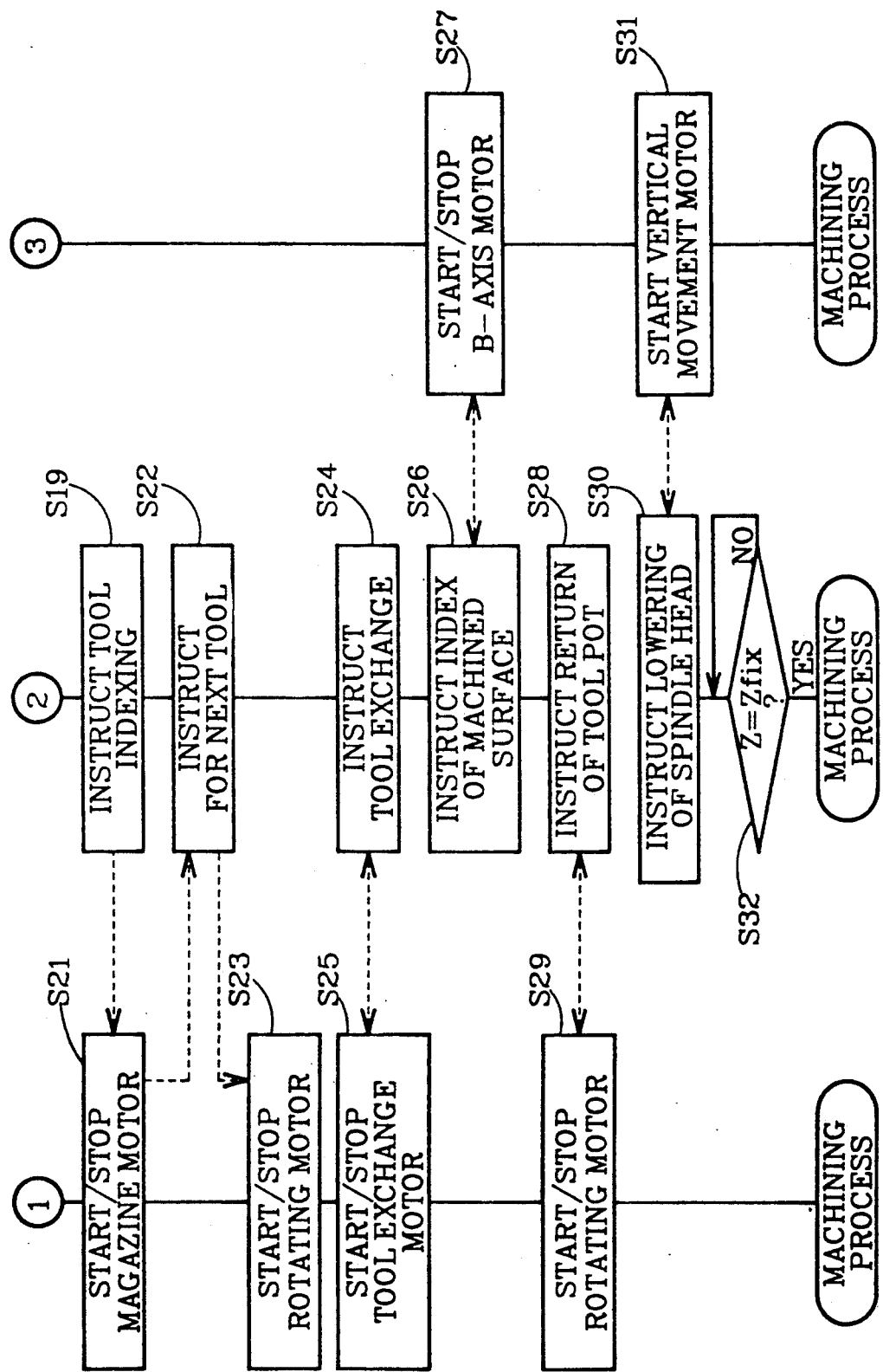

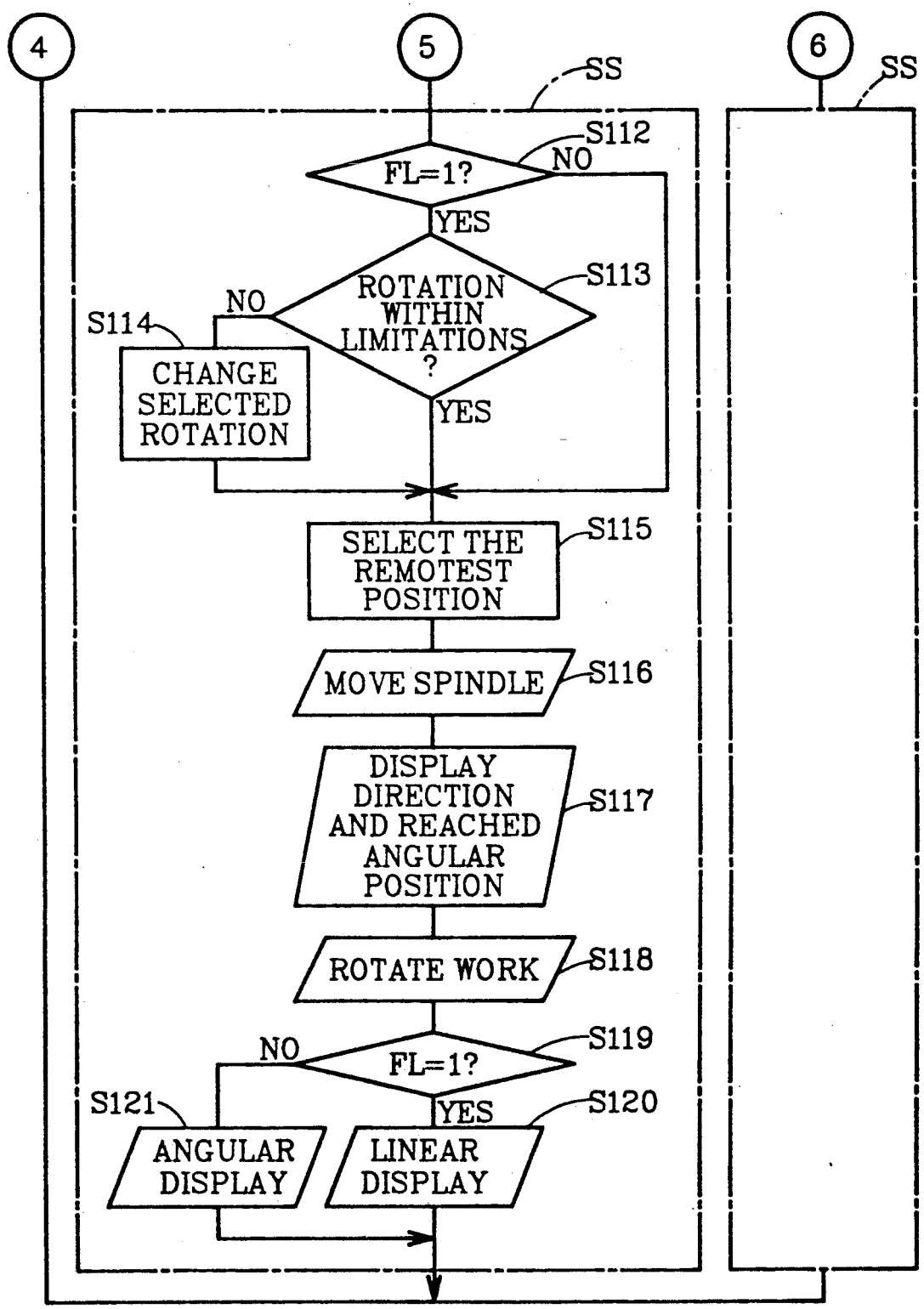

NUMERICALLY CONTROLLED MACHINE TOOL WITH AUTOMATIC TOOL EXCHANGE DEVICE AND INDEXING DEVICE

BACKGROUND OF THE INVENTION

The present invention relates to a machine tool that machines plural surfaces of a work successively while replacing a tool in a tool magazine according to a program for machining and, more particularly, to a numerically controlled machine equipped with a machined surface change means such as an indexing device that rotates a work about an axis perpendicular to the axis of a spindle to change the machined surface.

Conventionally, machine tools such as machining centers machine plural surfaces of a work successively while replace a tool in a tool magazine according to a program for machining. Such a machine tool is described in Japan Published Unexamined Application No. 63-123646. In this known machine tool, a tool magazine and a spindle head are mounted integrally. When the tool is replaced, the head is moved vertically along a column to change the distance between the work and the tip of the tool. Various tools of different shapes and dimensions such as taps, drills, and reamers are held in the magazine. When the tools should be replaced, the magazine is rotated to index the tool. Then, the rotating mechanism is driven to rotate a tool pot so that the tool for the next machining process can be aligned with the tool for the present machining process. Subsequently, an exchange arm is driven to exchange the tools.

When the tools on this machine are exchanged, the spindle head is moved back into the top of the column to prevent the tool for the present machining process from interfering with the tool for the next machining process and to prevent the work from interfering with a peripheral device of the work. Therefore, it takes a long time to shift the present machining process to the next machining process. In addition, during this time, the work is not machined. Consequently, the efficiency of the machining the work cannot be improved.

If the tool magazine is mounted integrally with the spindle head and the machine tool itself is miniaturized, the tools cannot be exchanged without large movement. This makes no difference with a machine with a separate tool magazine on top of the column. This integrated small type of the machine tool is not thus made best use of.

Another conventional machine tool is also provided with an indexing device, and a work is positioned on an indexing table of the indexing device to machine. Since the work can be rotated by the indexing table, various surfaces of the work can be machined. When the work is rotated to direct the surface to be machined to the tool after one surface is machined, the work is rotated by the minimum angle to the position for the next machining process. The work thus takes the shortest route. However, this machine tool presents the following problems.

(1) When the work takes the shortest route, the spindle head of the machine tool needs to be retracted in order to prevent the work and the peripheral device from interfering with the tool attached to the spindle head. The retracting spindle head is moved into a given position irrespective of the range of rotation. Therefore, the tool attached to the end of the spindle head moves excessively. As a result machining time is wasted.

(2) When the absolute angular position of the surface of the work to be machined next is displayed, the present angular position of the work can rarely be known. Therefore, the operator frequently fails to know whether the work should be rotated counterclockwise or clockwise when the work takes the shortest route for the next machining process. Accordingly, when the work is rotated, the operator must retract the spindle head for safety whether the work rotates clockwise or counterclockwise. When every step of the machining process is checked manually in the trace mode or test mode, the spindle head may be shifted to an appropriate position, not based on an NC program, before the work is rotated by the indexing device. The spindle head must be subsequently moved such that the spindle head should not interfere with the work or other component whether the work is rotated counterclockwise or clockwise, because the direction of next rotation is not know. As a result, the machining time is wasted. If the spindle head is positioned after the direction of rotation of the work is incorrectly estimated, then the work may interfere with and damage the tool.

(3) When the work is machined while the work is controlled to take the shortest route, an overstroke may occur during operation, depending on the kind of the work, on the manner in which the work is attached to the indexing device, or the kind of the indexing device. Then, the work may collide with and break the machining table, a cable on the indexing device, or other component. To prevent these situations, sufficient care must be taken in creating a program for machining.

SUMMARY OF THE INVENTION

It is an object of the invention to provide a machine tool that can exchange the tools with the least amount of operation and that is of the advantageously integrated small type.

It is another object of the invention to provide a numerically controlled machine that makes the work take the shortest route, and is easy to operate.

As shown in FIG. 1A, the machine tool includes a spindle head M3 for driving a spindle M2 holding a present tool M1 for the present machining process and for machining a work W; a tool magazine M5 for holding multiple tools T and for moving a next tool M4 for the next machining process to replace the present tool M1 into a given indexed position P1, a next tool preparation means M6 for moving the next tool M4 from the indexed position P1 toward the work W and for placing the next tool M4 in a takeout position P2; a tool exchange arm M7 for gripping the present tool M1 at one end and the next tool M4 at the other end, and for rotating and replacing the present tool M1 with the next tool M4; and a relative position change means M8 for changing the distances among the spindle head M3, the tool magazine M5, the tool exchange arm M7, and the work W. The machine tool further includes an arithmetic means M9 for calculating from the dimensions and the shapes of the present tool M1 and the next tool M4 the positions at which either tool is closest to an interference region defined by the shape of a peripheral device WT such as a work table and by the shape of the work W and at which none of the tools enter the interference region throughout tool exchange operation; a retreating means M10 for driving the relative position change means M8 according to the results of calculations performed by the arithmetic means M9, when the present tool M1 is exchanged with the next tool M4, to retract the spindle head M3, the tool magazine M5, and the tool exchange arm M7 from the peripheral device WT and the work W such that they do not interfere with each other and that they are closest to each other; and a tool exchange inhibiting means M11 for preventing the next tool preparation means M6 and the tool exchange arm M7 from operating until the retreating means M10 completes its operation.

As indicated by two-dot chain lines in FIG. 1A, the machine tool further includes a machined surface change means M12 for changing the machined surface of the work W according to the machining process; an interference-region notifying means M13 for notifying the arithmetic means M9 of the interference region defined by the overlap of the operation for changing the machined surface and the operation for exchanging the tools, when the exchange of the tools and a change of the machined surface are instructed for the next machining process; and a machined-surface change inhibiting means M14 for preventing the machined surface change means M12 from operating until the retreating means M10 completes its operation, when the next machining process involves the exchange of the tools and the change of the machined surface.

In the machine tool shown in FIG. 1A, when the tools are exchanged without changing the machined surface of the work W, the arithmetic means M9 calculates from the dimensions and the shapes of the present tool M1 and the next tool M4 the positions at which neither the tool M1 nor M4 enters the interference region defined by the shape of the peripheral device WT such as the work table and by the shape of the work W and at which either tool is closest to the interference region throughout the operation for exchanging the tools. When the tools are exchanged, the retreating means M10 drives the relative position change means M8 according to the results of calculations performed by the arithmetic means M9 to retract the spindle head M3, the tool magazine M5, and the tool exchange arm M7 from the peripheral device WT and from the work W such that they do not interfere with each other and that they are closest to each other. The tool-exchange inhibiting means M11 prevents the next tool preparation means M6 and the tool exchange arm M7 from operating until the retreating means M10 completes its operation. Therefore, by causing the spindle head M3, the tool magazine M5, and the tool exchange arm M7 to retract their least distances, neither the present tool M1 nor the next tool M4 interferes with the work W or its peripheral device WT throughout the operation for exchanging the tools. In this way, the tools are exchanged at the closest positions at which no interference occurs.

The machine tool further includes the machined surface change means M12 for changing the machined surface of the work W according to the machining process, such as an indexing table. When the exchange of the tools and the change of the machined surface are instructed for the next machining process, the interference-region notifying means M13 notifies the arithmetic means M9 of the interference region defined based on the overlap of the change of the machined surface and the exchange of the tools. Subsequently, the arithmetic means M9 calculates the closest positions at which no interference takes place, by taking account of the operation for changing the machined surface. As a result, the retreating means M10 retracts the spindle head M3, the tool magazine M5, and the tool exchange arm M7 into their closest positions at which no interference occurs, the positions being assumed when the machined surface is changed. On the other hand, the tool-exchange inhibiting means M11 inhibits the next tool preparation means M11 inhibits the next tool preparation means M6 and the tool exchange arm M7 from operating. At the same time, the machined-surface change inhibiting means M14 inhibits the machined surface change means M12 from operating until the retreating means M10 completes its operation. Consequently, the operation for exchanging the tools and the operation for changing the machined tool are carried out by the minimum amount of action.

The operation for changing the machined surface is not limited to rotation of the indexing table. The operation may also includes the exchanging of one machined surface with another surface at a different height by an X-Y table.

As shown in FIG. 1B, a numerically controlled machine has a spindle head H for driving a spindle holding a tool for machining a work; a relative position change means M21 for changing relative position between the spindle head H and the work; and a machined surface change means M22 for changing the machined surface of the work by rotating the work about an axis perpendicular to the axis of the spindle. The machine machines the work in the entered sequence of machining process. The machine also includes a noninterference closest position storage means M23 for storing the positions at which the tool does not enter an interference region where the tool interferes with the work or peripheral device such as a work table and at which the tool is closest to the interference region, corresponding to each angular position of the work; a rotation-selecting means M24 for selecting direction and angle of the minimum rotation for bringing the work into the angular position for the next machining process, based on the angular positions of the present and the next machining process; a remotest position-selecting means M25 for selecting the position remotest from the work out of the noninterference closest positions in the range of the rotation selected by the rotation-selecting means M24; a shift instruction means M26 for causing the relative position change means M1 to move the spindle head H into the remotest position selected by the remotest position-selecting means M25; and a rotation instruction means M27 for instructing the machined surface change means M22 to rotate in the manner selected by the rotation-selecting means M24 after the spindle head H is moved into the remotest position under the instructions of the shift instruction means M26. If the angle of the rotation of the work to the angular position for the next machining process is equal in either rotation direction, the rotation-selecting means M24 compares the remotest positions selected by the remotest position-selecting means M25 in the ranges of rotation in both directions and selects the rotational direction with less remotest positions giving the minimum rotation.

The numerically controlled machine, to solve the aforementioned problem (2), additionally includes a rotational direction display means M28 for displaying the direction of rotation determined by the rotation-selecting means M24, as shown by the dashed line in FIG. 1B.

As shown in FIG. 1C, a numerically controlled machine solves the problem (3) described above, and machines a work by a tool held by the spindle head in the entered sequence of machining process. The machine includes a machined surface change means M32 for changing the machined surface of the work by rotating the work about an axis perpendicular to the axis of the spindle according to the machining process; a limitation storage means M39 for storing limitations imposed on the direction and the angle of the rotation of the work according to the kind of the machined surface change means M32 and to the kind of the work installed on the machined surface change means M32; a rotation-selecting means M34 for selecting the direction and the angle of the minimum rotation for bringing the work into the angular position of the next machining process, based on the angular positions of the present and the next machining processes; a rotation change means M40 for changing the direction and the angle of the rotation to the direction opposite to the selected direction and to the angle of [2π-(the selected angle)], respectively, when the selection made by the rotation-selecting means M34 is not permitted by the limitations stored in the limitation storage means M39; and a rotation instruction means M37 for notifying the machined surface change means M32 of either the rotation selected by the rotation-selecting means M34 or of the rotation changed by the rotation change means M40, as shown in FIG. 1C. Where the above-described limitations exist, the angle of the rotation is displayed in the form of a straight line in the range from the reverse direction 2Nπ (N is an integer equal to or greater than 2) to the forward direction 2Nπ. Where no limitations exist, the angle is displayed within the range of one rotation 2π. In this way, these two situations are distinguished from each other in display.

In the numerically controlled machine in FIG. 1B, the rotation-selecting means M24 selects the direction and the angle of the minimum rotation which moves the machined surface of the work from the present angular position to the angular position for the next machining process. Then, the remotest-position selecting means M25 selects the position remotest from the work out of the noninterference closest positions of the work stored in the noninterference closest position storage means M23 within the range of rotation selected by the rotation-selecting means M24. Subsequently, the shift instruction means M26 causes the relative position change means M21 to move the spindle head H into the remotest position selected by the remotest-position selecting means M25. Subsequently, the rotation instruction means M27 informs the machined surface change means M22 of the selected rotation to change the machined surface. In this way, before the work is rotated by minimum angle to the next angular position, the tool attached to the end of the spindle head H moves to a position closest to the peripheral device and the work without interfering with them.

In the numerically controlled machine shown in FIG. 1B, the rotational direction display means M8 displays the direction of rotation of the work controlled so as to rotate the shortest route.

In the numerically controlled machine as shown in FIG. 1C, the rotation-selecting means M34 selects the direction and the angle of the minimum rotation for moving the machined surface of the work from the present angular position to the angular position for the next machining process. If the selected rotation is not allowed by the limitations which have been previously stored in the limitation storage means M39 and are imposed on the direction and the angle of rotation, then the rotation change means M40 changes the selected rotation to the larger rotation for bringing the machined surface of the work to the angular position for the next machining process. Then, the rotation instruction means M37 instructs the machined surface change means to rotate either in the manner selected by the rotation-selecting means M34 or in the manner modified by the rotation change means M40 to change the machined surface. Thus, the work takes the shorter route. If the limitations inhibit the work from taking the shorter route, the work takes the longer route.

BRIEF DESCRIPTION OF THE DRAWINGS

FIGS. 10A and 10B are flowcharts illustrating the processing for exchanging the tools.

FIGS. 11A and 11B are flowcharts illustrating a main routine for machining he work.

DETAILED DESCRIPTION OF THE PREFERRED EMBODIMENTS

Figure 1A:
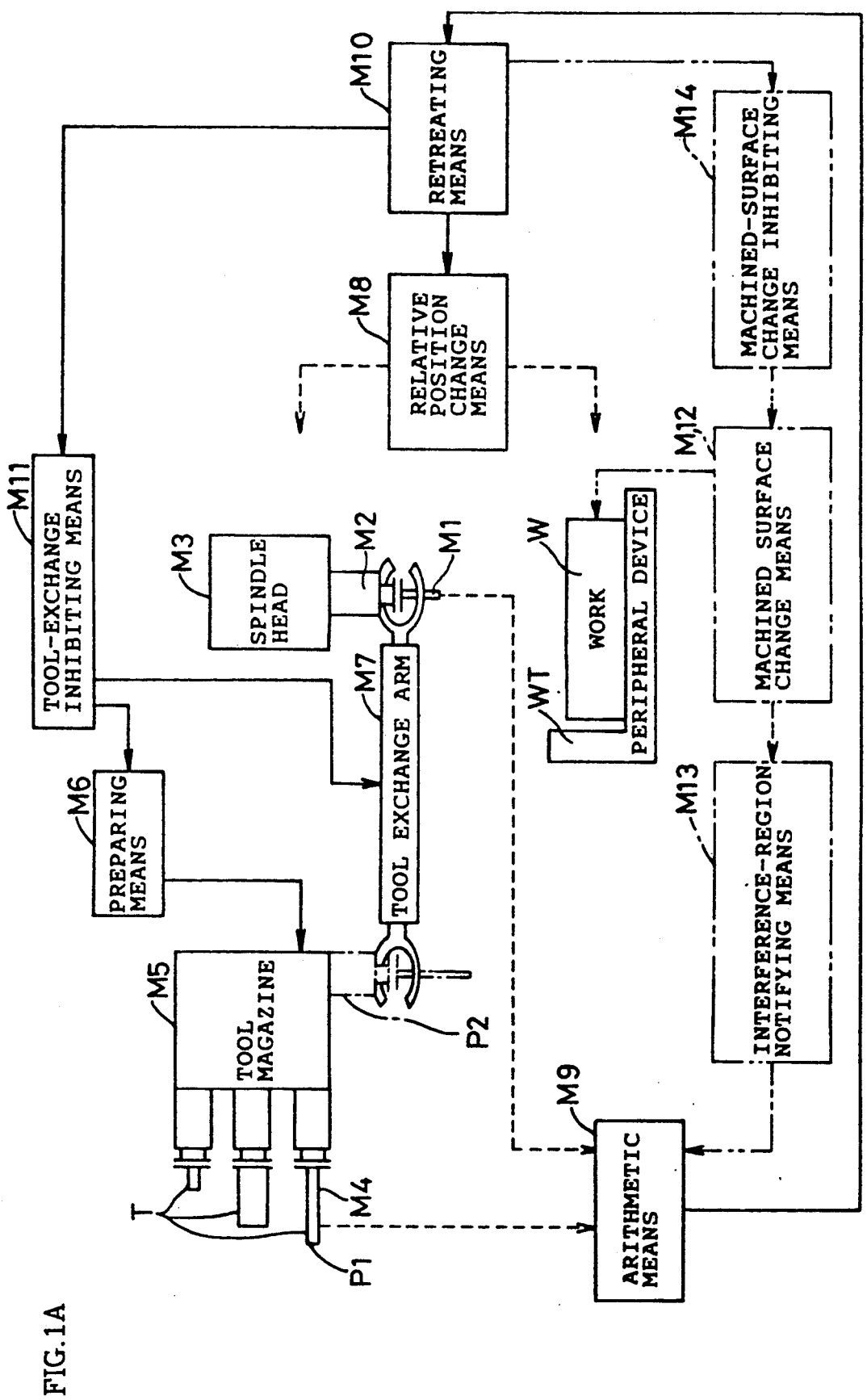
FIGS. 1A-1C are block diagrams of machine tools according to the invention.
Figure 1B:
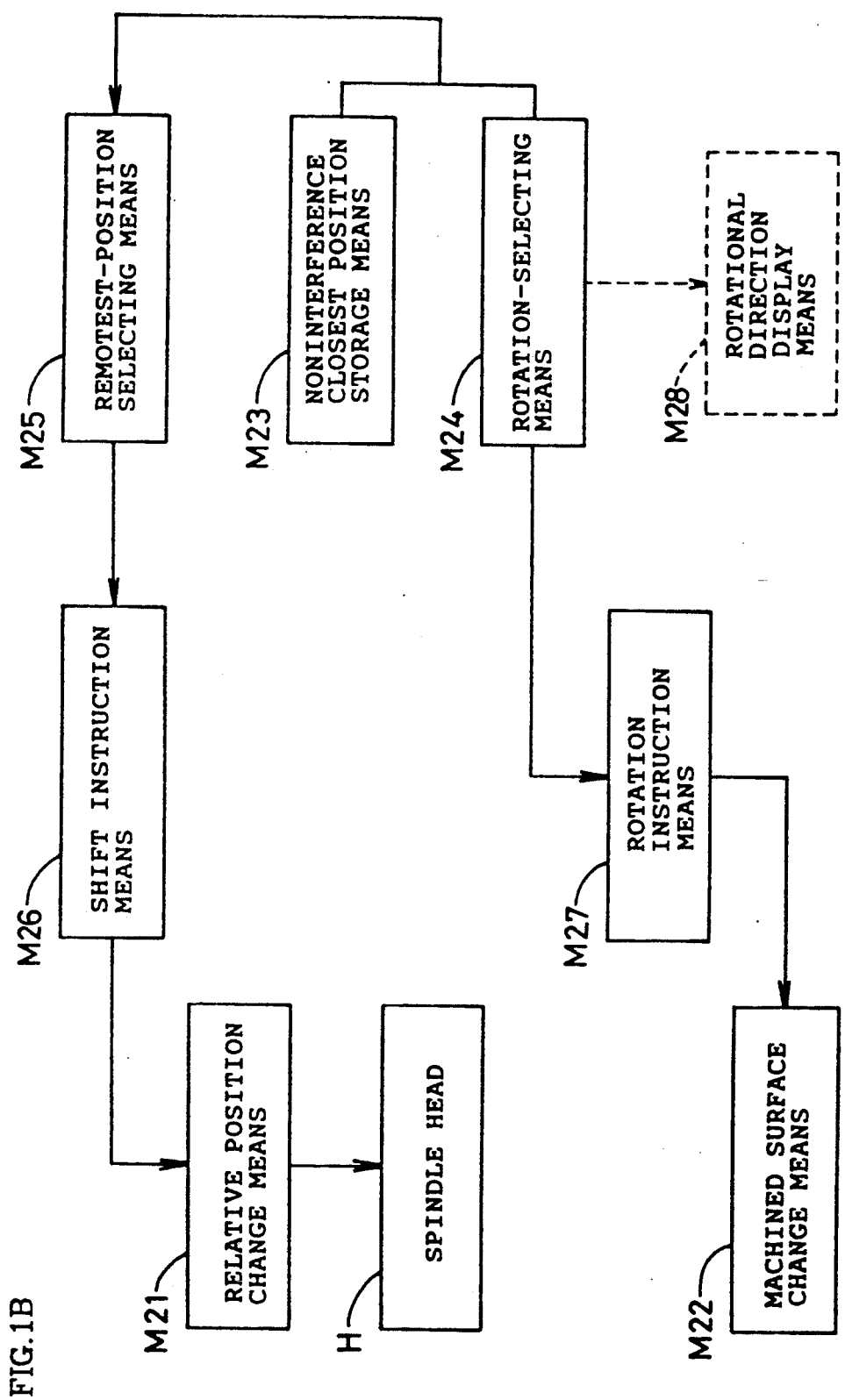
Figure 1C:
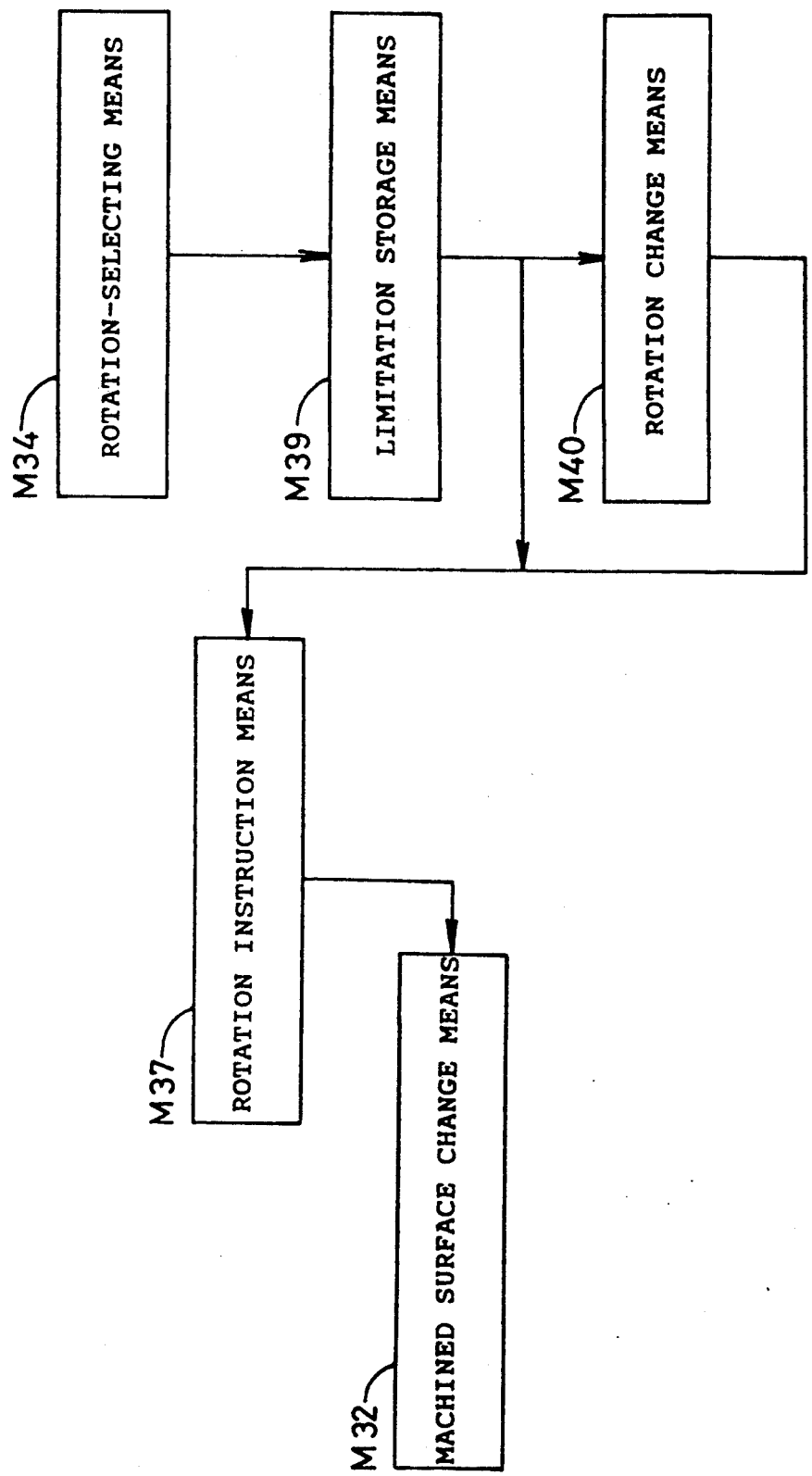
Figure 2:
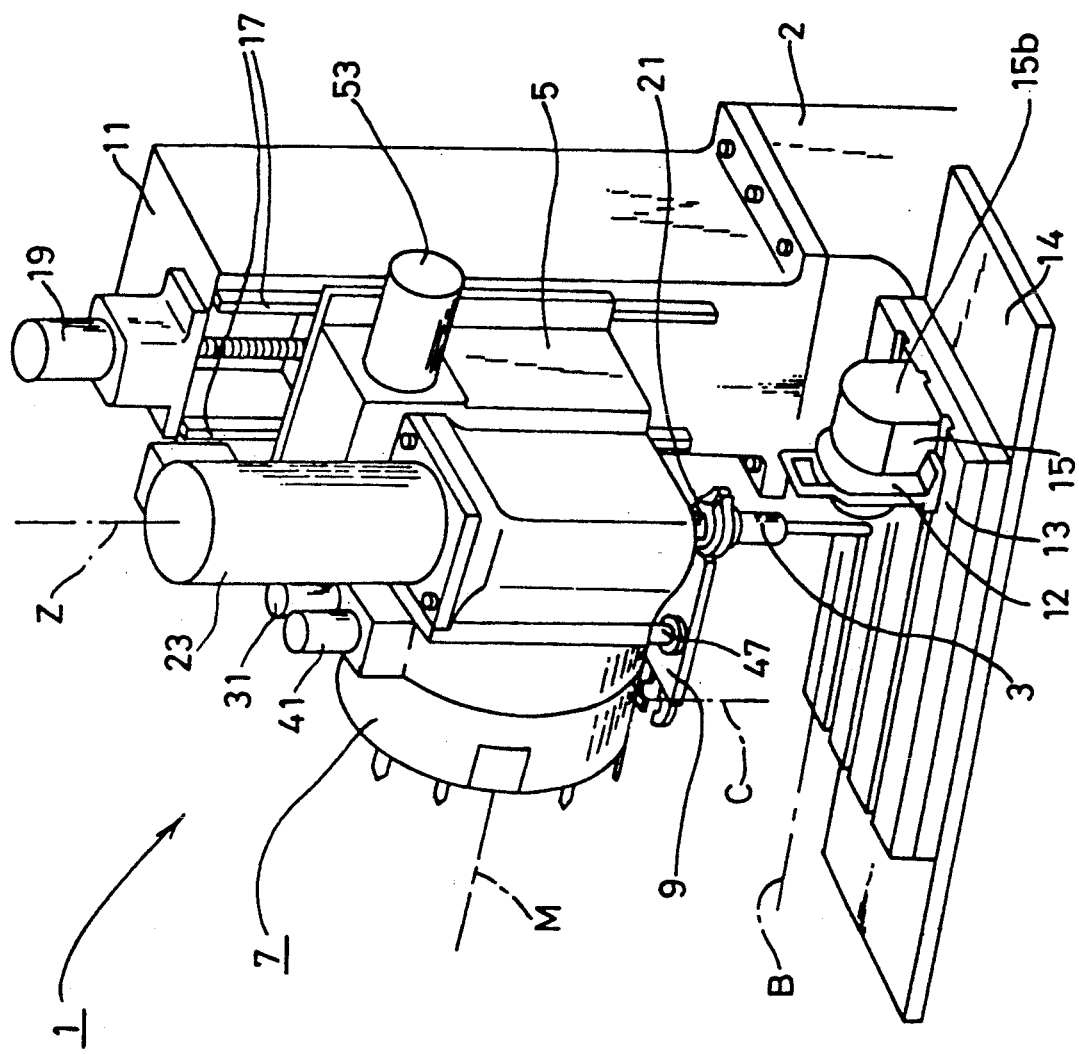
FIG. 2 is a perspective view of a machining center of the integrated small type according to the invention.

As shown in FIG. 2, a machining center 1 comprises a spindle head 5, a tool magazine 7 connected to one side of the spindle head 5, a tool exchange arm 9 integrally disposed between the head 5 and the tool magazine 7, a column 11 supporting the rear of the spindle head 5, a work table 13 mounted below the column 11, and an indexing table 15 mounted on the top surface on the right side of the work table 13 as viewed in the figure. The indexing table 15 rotates a work W about an axis B. A tool 3 used for machining is detachably held by the spindle head 5. The work table 13 can move within the X-Y plane shown in FIG. 2.

The spindle head 5 is slidably mounted to the column 11 via a pair of rails 17 running vertically along the front surface of the column 11. The head 5 is caused to slide vertically on the rails 17 by a vertical movement motor 19. The tool 3 is held by a spindle 21 incorporating a clamping mechanism. The spindle 21 is driven by a spindle motor 23. The tool 3 held at the end of the spindle 21 machines a work.

Figure 3B:
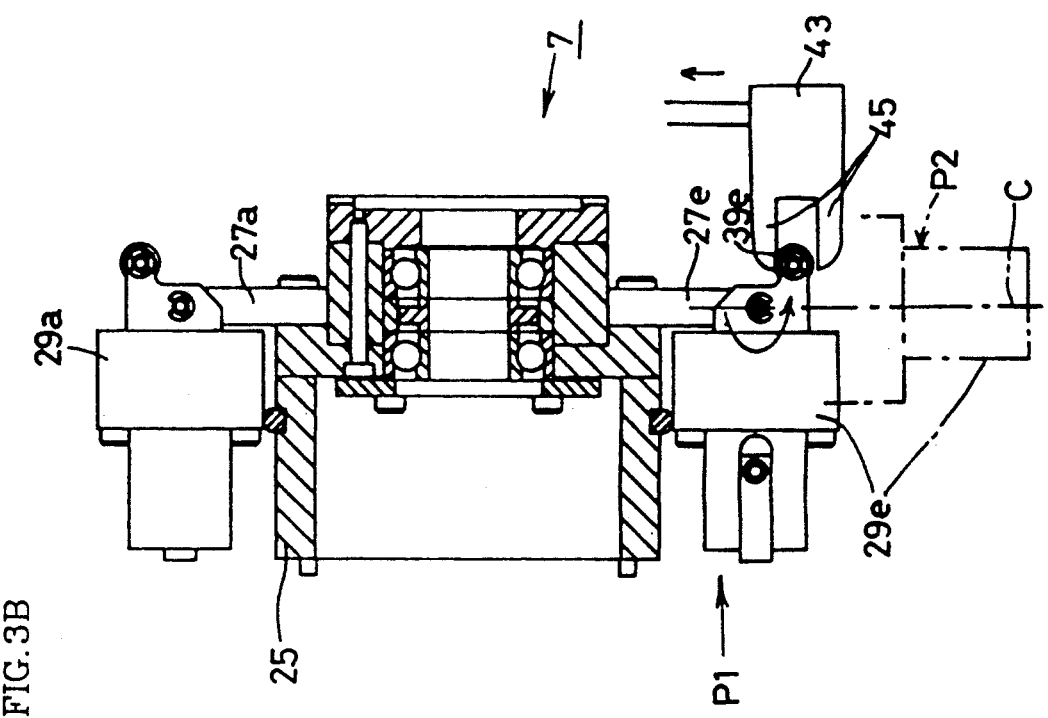
FIG. 3B is a longitudinal cross section taken along line X—X in FIG. 3A.
Figure 3A:
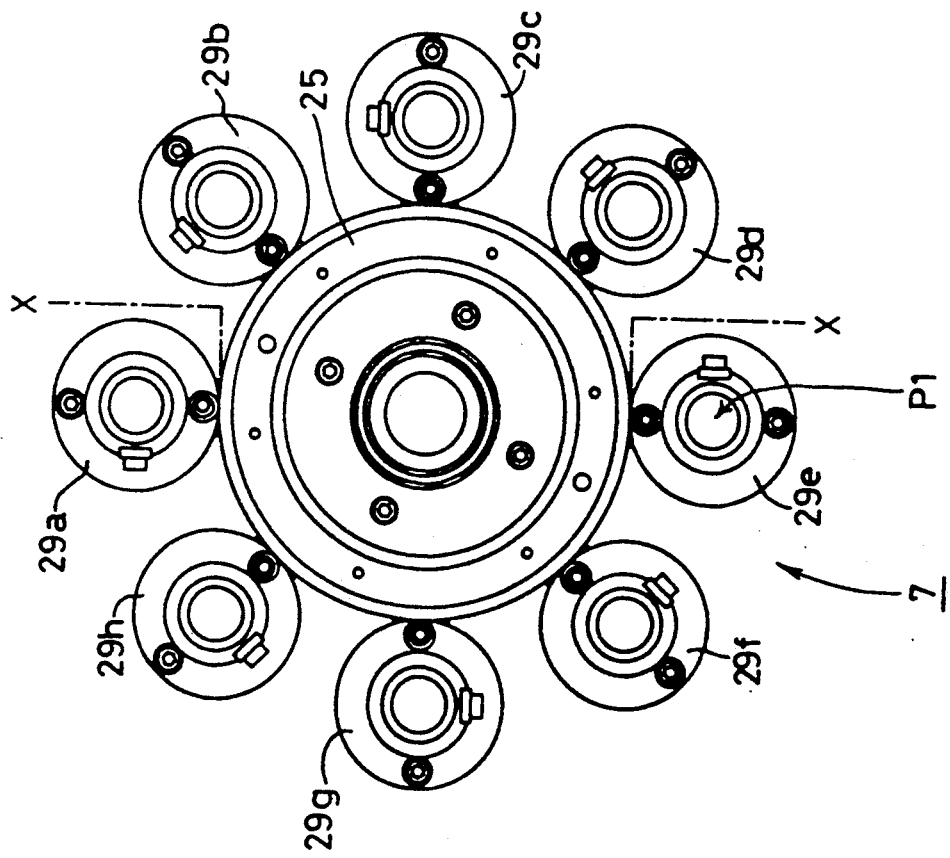
FIG. 3A is a front elevation of a tool magazine used in the machining center shown in FIG. 2.
Figure 3C:
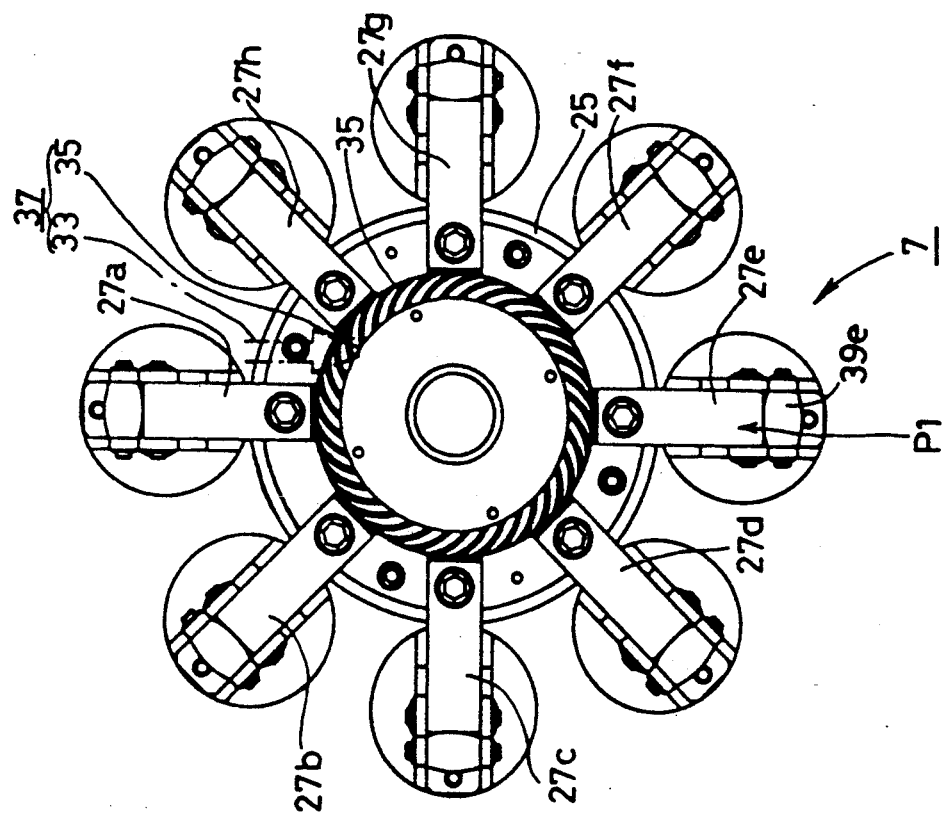
FIG. 3C is a rear view of the tool magazine shown in FIGS. 3A and 3B.

The tool magazine 7 is mounted integrally with one side of the spindle head 5 so as to be rotatable about the axis M of the magazine 7 perpendicular to an axis Z of the spindle 21. As shown in FIGS. 3A through 3C, the tool magazine 7 comprises eight pot arms 27a through 27h mounted radially on the rear of a body 25 of the tool magazine 7 and tool pots 29a through 29h pivotally mounted to the arms 27a through 27h, respectively. Each of various tools, such as a drill, a tap, and a reamer, is accommodated in each of the tool pots 29a through 29h. A hypoid gear 37 of a high reduction ratio is mounted in the center of the rear surface of the tool magazine 7. The hypoid gear 37 comprises a pinion 33 driven by a magazine motor 31 and a gear wheel 35 that meshes with the pinion 33 on stagger axes. The tool magazine 7 is rotated via the hypoid gear 37 around the axis M by the magazine motor 31 to move any of the tool pots 29a through 29h with a desired tool into a tool indexing position P1 located under the tool magazine 7.

The tool pot 29e carried into the tool indexing position P1 is rotated about 90° and directed downward by a rotating motor 41 via a grip rod 39e mounted on the rear surface of the tool pot 29e. As indicated by the dot-and-dash lines in FIG. 3B, the grip rod 39e is inserted between grip claws 45 of an arm 43 in the tool indexing position P1. The arm 43 is driven by the rotating motor 41 that is juxtaposed with the magazine motor 31 on the top of the spindle head 5. When the rotating motor 41 pulls the arm 43 upward, the tool pot 29e is rotated downward and set in a tool takeout position P2.

Figure 4:
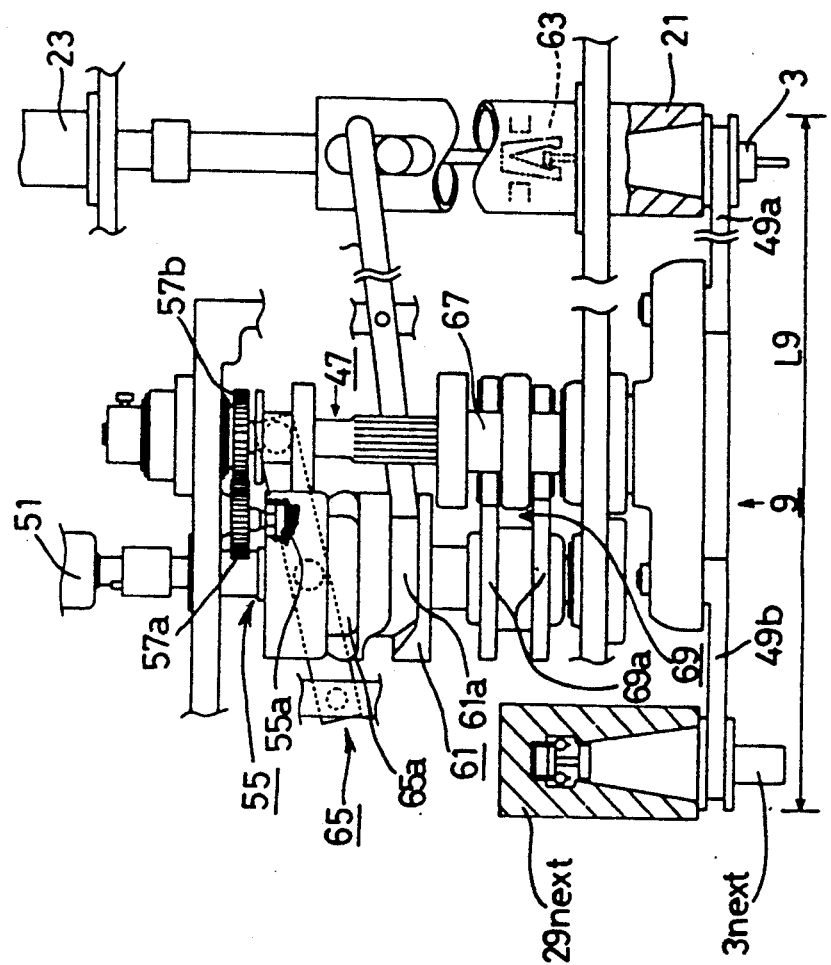
FIG. 4 is a front elevation partially in cross section of the inside of the machining center shown in FIG. 2, for showing the mechanism for driving a tool exchange arm.

As shown in FIG. 4, the tool exchange arm 9 is mounted to the lower end of an exchange arm shaft 47 that is mounted inside the spindle head 5. The arm 9 has a pair of fingers 49a and a pair of fingers 49b at opposite ends, respectively. A cam shaft 51 juxtaposed with the exchange arm shaft 47 elevates, lowers, or rotates the exchange arm shaft 47 or opens or closes the fingers 49a and 49b. The cam shaft 51 is rotated by a tool exchange motor 53 disposed on the right side of the spindle head 5.

Figure 5:
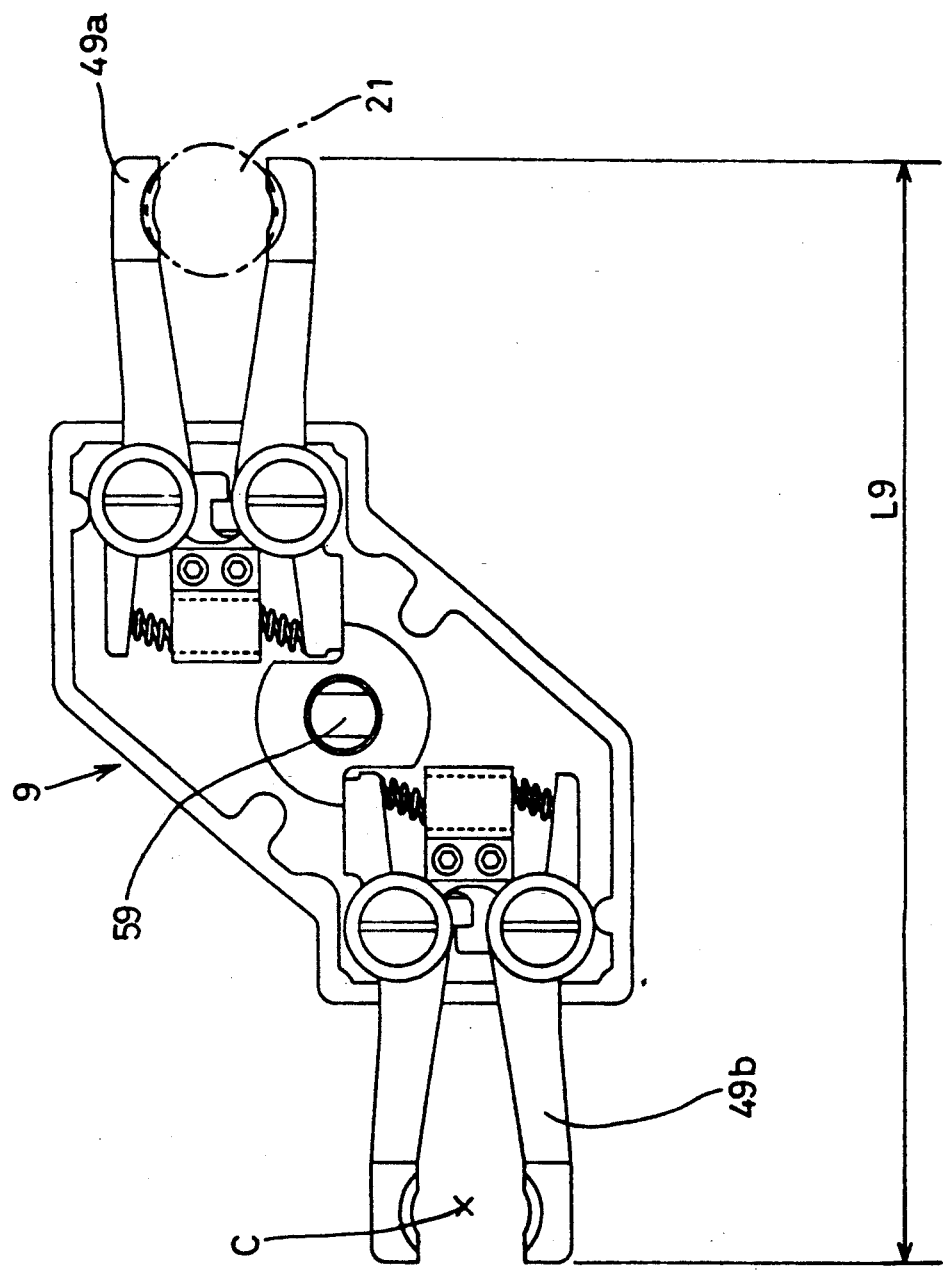
FIG. 5 is a bottom view of the tool exchange arm shown in FIG. 4.

As shown in FIGS. 4 and 5, the fingers 49a and 49b are normally spaced apart by the tool exchange arm 9. The length $L_9$ of the tool exchange arm 9 is normally set such that one pair of the fingers 49a reaches the tool 3 held on the spindle 21 and that the other pair of fingers 49b reaches a tool 3next placed on a tool takeout axis C in the tool takeout position P2, the tool 3next being used for the next machining process. The exchange arm shaft 47 is located between the tool takeout axis C passing through the tool takeout position P2 and the spindle 21. Accordingly, when the tool exchange arm 9 is rotated 180°, the fingers 49a at one end are exchanged with the fingers 49b at the other end, thereby gripping the tools 55 on the tool takeout axis C in a position aligned with the spindle 21.

The operation of the tool exchange arm 9 is next described by referring to FIGS. 4 and 5. Under the above-described normal condition, if the cam shaft 51 is rotated by the tool exchange motor 53, a cam groove 55a formed in the upper surface of a first cam member 55 rotates a gear 57a a given angle. A gear 57b meshes with the gear 57a. Since the gear 57b rotates a given angle, a rod 59 passing through the exchange arm shaft 47 is rotated to close the fingers 49a and 49b simultaneously. In this way, the tools 3 and 3next are simultaneously gripped by the tool exchange arm 9.

Subsequently, a cam groove 61a formed in the outer surface of a second cam member 61 actuates to depress and open a chuck 63 mounted in the spindle 21, for releasing the tool 3. A cam groove 65a formed in the outer surface of a third cam member 65 activates to depress the exchange arm shaft 47, thus detaching the tools 3 and 3next from the spindle 21 and a tool pot 29next simultaneously. At the same time, the exchange arm shaft 47 engages a sleeve 67 by a spline mounted on its outer surface. The cam shaft 51 has a fourth cam member 69 including a cam plate 69a. The cam plate 69a rotates the exchange arm shaft 47 180° together with the sleeve 67.

Then, the third cam member 65 elevates the tool exchange arm 9. The tool exchange arm 9 thus exchanges the tool 3 with the tool 3next, and positions the tools 3 and 3next in the tool pot 29next and in the spindle 21, respectively. Subsequently, the second cam member 61 activates to close the chuck 63 of the spindle 21. Before the cam shaft 51 makes one full revolution, the first cam member 55 rotates the gear 57a in reverse. The fingers 49a and 49b are thus spaced apart.

The tools are exchanged quickly and correctly in this way. The operation of the cam members 55, 61, 65 and 69 while the cam shaft 51 makes one revolution, is described in Japan Published Unexamined Patent Application No. 63-123646.

Figure 6:
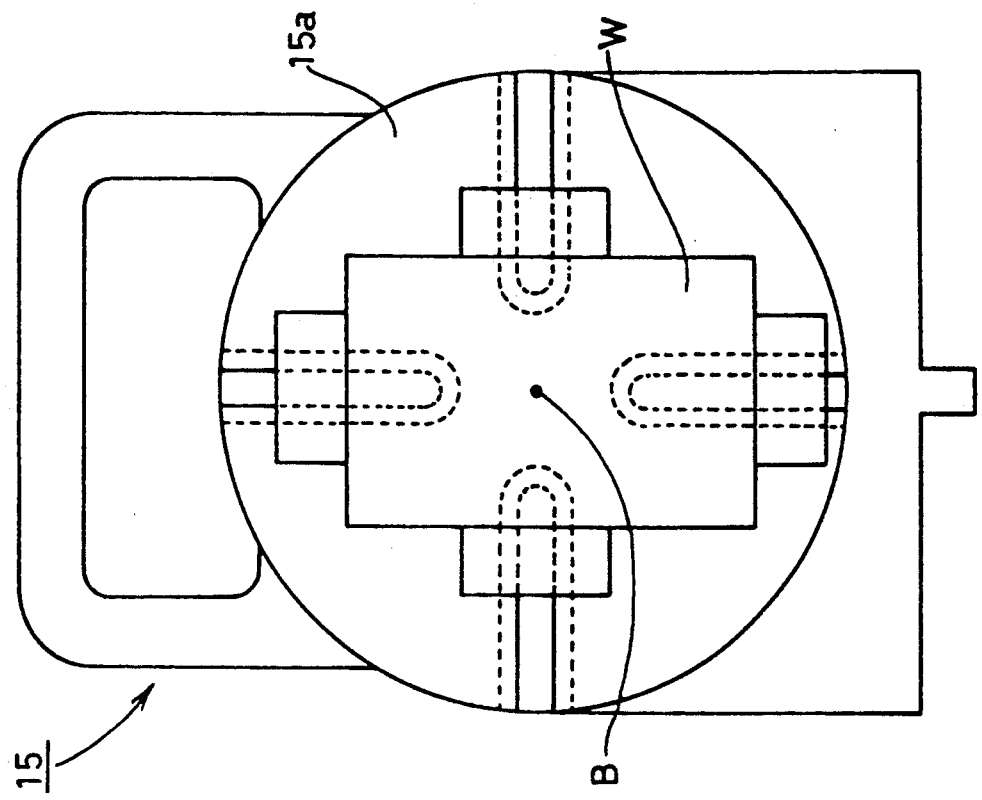
FIG. 6 is a front elevation of the indexing table holding a work shown in FIG. 2.

As shown in FIG. 6, the indexing table 15 rotatably holds the work W. The table 15 grips the work W from above and below and from both sides on a work installation surface 15a. The work W is rotated by a B-axis motor 15b about the axis B to change the machined surface.

Figure 7:
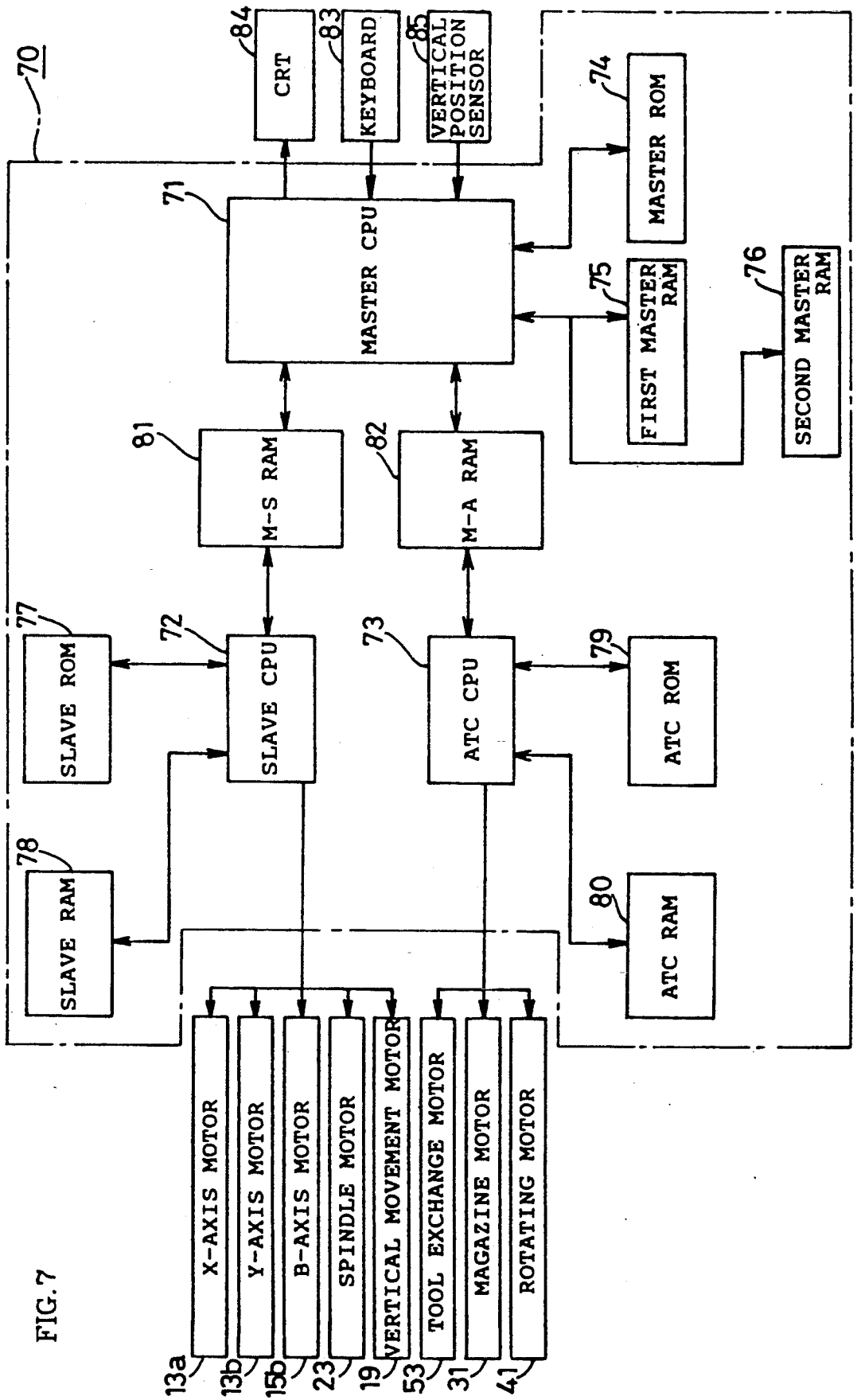
FIG. 7 is a block diagram of a control circuit for the machining center shown in FIG. 2.

As shown in FIG. 7, an electronic controller 70 controls the motors in the present embodiment. The electronic controller 70 includes a master CPU 71 for controlling the entire operation, a slave CPU 72 for controlling the machining of the work, and an automatic tool exchange CPU 73 (hereinafter referred to the ATC CPU 73) for controlling the exchange of the tools.

The master CPU 71 is connected to a master ROM 74 for storing program, constants, and the like for operating the electronic controller 70, a first master RAM 75 for temporarily storing variables, flags and the like, and a second master RAM 76 for storing tool exchange timings and programs for controlling the tools to machine the work. When the power is off, the second master RAM 76 is backed up to prevent loss of the data contained therein.

A slave ROM 77 for storing programs, constants, and the like for driving motors to machine the work, and a slave RAM 78 for temporarily storing variables, flags and the like are connected with the slave CPU 72 for controlling the machining of the work.

The ATC CPU 73 is connected to an ATC ROM 79 and an ATC RAM 80. The ATC ROM 79 stores programs for driving the tool exchange arm 9, constants, and the like. The ATC RAM 80 temporarily stores variables, flags, and the like, which are used while the exchange of the tools is being controlled.

A master-slave RAM 81 (hereinafter referred to as the M-S RAN 81) is connected between the master CPU 71 and the slave CPU 72. The M-S RAM 81 stores instructions sent from the master CPU 71 to the slave CPU 72, signals sent from the slave CPU 72 to the master CPU 71, and other data. Data is written to or read from the M-S RAM 81 by both the master CPU 71 and the slave CPU 72.

A master-ATC RAM 82 (hereinafter referred to as the M-A RAM 82) for storing instructions sent from the master CPU 71 to the ATC CPU 73, signals sent in the opposite direction, and other data is connected between the master CPU 71 and the ATC CPU 73. In the same way as the M-S RAM 81, data is written to or read from the M-A RAM 82 by both master CPU 71 and ATC CPU 73.

A keyboard 83 for entering a machining program and a CRT 84 for displaying the program are connected to the master CPU 71. The keyboard 83 has keys, switches for starting steps of machining process, and individually-operated manual switches for checking each machining step. The master CPU 71 is also connected to a vertical position sensor 85 for detecting the absolute vertical position of the spindle head 5 according to the rotation of the vertical movement motor 19. The CPU 71 receives output signals from the vertical position sensor 85.

The slave CPU 72 is connected to an X-axis motor 13a, a Y-axis motor 13b, and the B-axis motor 15b. the X-axis motor 13a moves the work table 13 along the axis X. The Y-axis motor 13b moves the work table 13 along the axis Y. The B-axis motor 15b rotates the indexing table 15 around the axis B. The slave CPU 72 sends control signals to the motors 13a, 13b, and 15b to change the machined surface and the machined position of the work W. The slave CPU 72 is also connected with and sends control signals to the vertical movement motor 19 and the spindle motor 23, for machining the determined machined surface of the work W with a given tool at the determined machined position of the work W.

Meanwhile, the ATC CPU 73 is connected to the magazine motor 31 and motor 41. The ATC CPU 73 sends a control signal to the magazine motor 31 to rotate the tool magazine 7, thus moving the next tool 3next into the tool indexing position P1. The CPU 73 also feeds a control signal to the rotating motor 41 to rotate the next tool pot 29next from the indexing position P1 toward the tool takeout axis C. The next tool 3next is thus prepared. The ATC CPU 73 is also connected to and sends a control signal to the tool exchange motor 53 for driving the cam shaft 51 to exchange the tools 3 and 3next.

The slave CPU 72 and the ATC CPU 73 control the machining of the work and the exchange of the tools, respectively, under the control of the master CPU 71. The master CPU 71 reads one step of the machining program entered with the keyboard 83 at a time from the second master RAM 76. The master CPU 71 writes the data related to the machining of the work into the M-S RAM 81, and the slave CPU 72 reads the data from the M-S RAM 81, and determines the rotation speed of the spindle motor 23 to control the machining of the work. The master CPU 71 writes data related to the exchange of the tools into the M-A RAM 82, and the ATC CPU 73 reads the data from the M-A RAM 82, thereby controlling the exchange of the tools. When the tools are exchanged, the slave CPU 72 controls the movement of rotation of the work table 3 and the indexing table 15 at the same time. The master CPU 71 sends timing signals to the slave CPU 72 and the ATC CPU 73 to prevent the work W and its peripheral device such as the indexing table 15 from contacting the tools 3 and 3next during the exchange of the tools 3 and 3next.

To prevent the work W and its peripheral device from interfering with the tools 3, the data about the interference region is processed in the manner described below, by using the machining program and data entered through the keyboard 83.

When the work W is not rotated about the axis B, the data of the interference region is entered. When the work W is rotated, the other data of the interference region is entered.

Figures 8A, 8B:
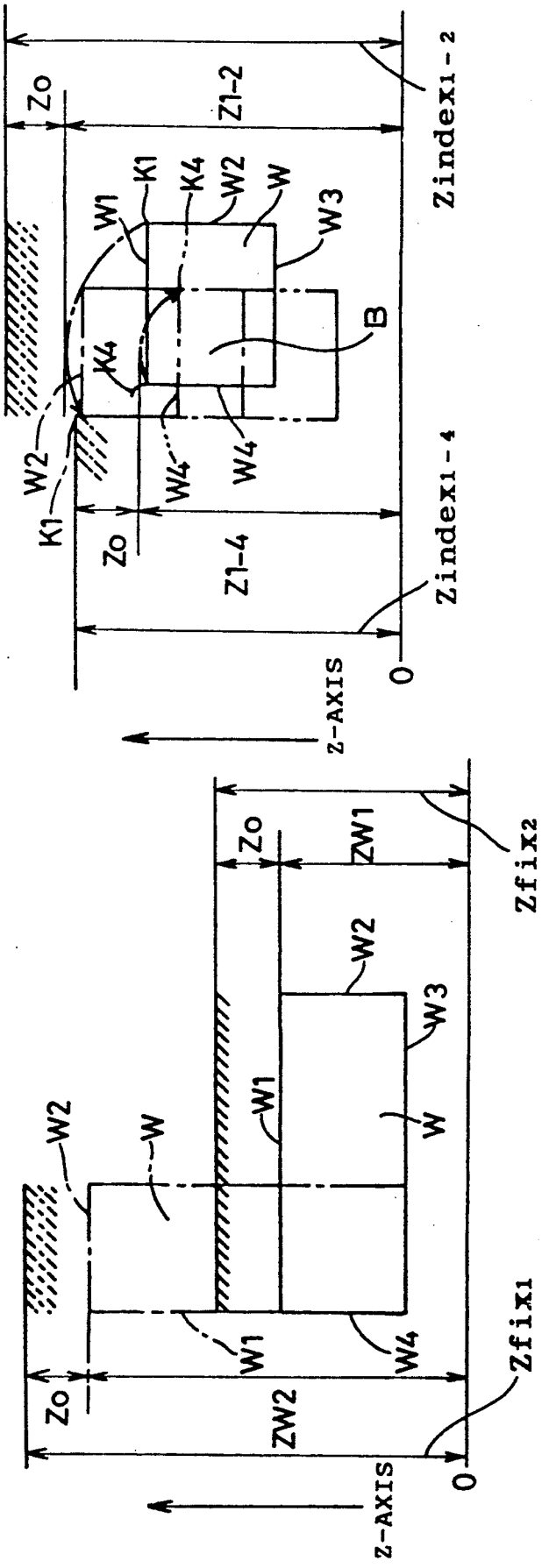
FIG. 8A is a diagram illustrating the manner in which an interference region is created for each machined surface of the work.
FIG. 8B is a diagram similar to FIG. 8A, but in which a rotation about axis B is made.

When the work W is not rotated about the axis B, as shown in FIG. 8A, heights ZW1 and ZW2 of machined surfaces W1 and W2 of the work W are entered. The heights ZW1 and ZW2 with a given allowance Z0 added thereto are stored as interference heights Zfix1 and Zfix2, respectively, at given addresses of the second master RAM 76. The interference heights of the other machined surfaces W3 and W4 are entered in the same away.

When the work W is rotated about the axis B, as shown in FIG. 8B, each interference height of the machined surfaces W1 through W4 before and after the rotation about the axis B in each direction is entered as follows.

As shown by a solid line in FIG. 8B, the work W is positioned with the first machined surface W1 facing upward, and as shown by a dot arrow, the work W is rotated counterclockwise such that the second machined surface W2 faces upward. During such rotation, a corner K1 formed between the first and second machined surfaces W1 and W2 passes through the highest position. Consequently, a height Z1-2 of the corner K1 in FIG. 8B is entered through the keyboard 83. The height Z1-2 with the allowance Z0 added thereto in FIG. 8B is stored into a given address of the second master RAM 76 as an interference height Zindex1-2 when the surface to machine is changed from the first surface W1 to the second surface W2.

As shown by a two-dot chain line in FIG. 8B, when the work W is rotated clockwise as shown by a two-dot arrow such that the surface to machine is changed from the first machined surface W1 to the fourth machined surface W4, a corner K4 formed between the machined surfaces W1 and W4 passes the highest point. A height Z1-4 of the corner K4 with the allowance Z0 added thereto is stored into a given address of the second master RAM 76 as an interference height Zindex1-4. When the work W is rotated about the axis B in any direction, an interference height is thus entered corresponding to the direction, the change in the surface to machine, and other conditions. If the shape and the machined position of the work W and other data are entered in a CAD system, the entered data can be rotated. An interference height Zindex at the time of the rotation of the work W about the axis B can be automatically prepared based on a locus of the rotated data.

The types, dimensions and other data of the eight tools in the tool pots 29a through 29h, respectively, of the tool magazine 7 are entered from the keyboard 83 and stored in a tool management map in the second master RAM 76.

Figure 9:
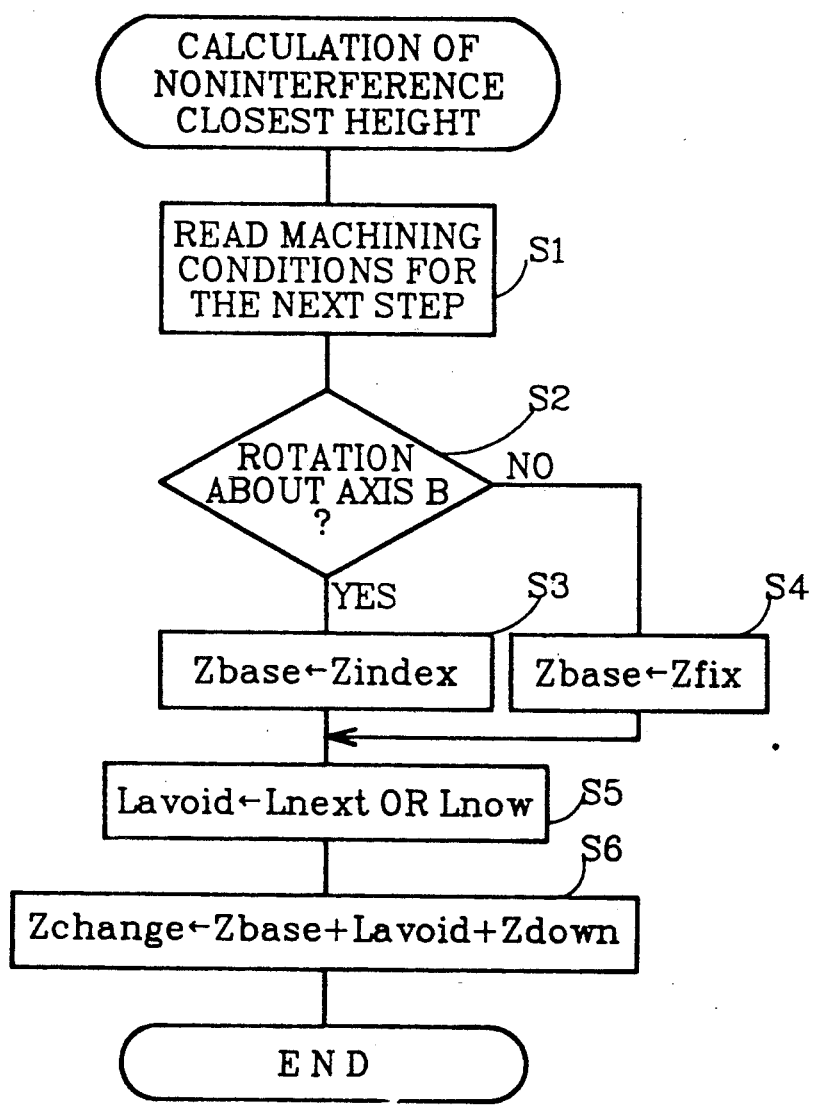
FIG. 9 is a flowchart illustrating the processing for calculating noninterference closest height.

The master CPU 71 refers to the interference heights Zfix1, Zindex1-2 and the like, and calculates the minimum vertical distance by which the spindle 21 retreats according to the machining conditions at the next machining step in the program, such as the surface to machine, the corresponding tool, and the like. The minimum vertical distance will now be referred to as a non-interference closest height. The processing of this calculation is shown in FIG. 9.

First, step S1 reads the machining conditions in the next machining process such as the next tool 3next and the rotation about the axis B before the present machining process ends. Step S2 determines whether the rotation of the work W about the axis B is instructed for the next machining process. If at step S2 the rotation about the axis B is instructed, at step S3 the interference height Zindex is set as noninterference closest height reference value Zbase, the interference height Zindex being determined from the machined surfaces in the present and next machining processes and the rotation thereof about the axis B. If at step S2 the next machining process involves no rotation about the axis B, at step S4 an interference height Zfix, such as the interference heights Zfix1 and Zfix2 shown in FIG. 8A, is set as the noninterference closest height reference value Zbase.

Subsequently, step S5 reads and compares a length Lnext of the next tool 3next and a length Lnow of the present tool 3 from the tool management map in the second master RAM 76, and sets the longer length as a retreated tool length Lavoid. When the tool exchange arm 9 vertically moves at the time of the exchange of the tools, the tools are taken out a distance Zdown. Step S6 obtains a noninterference closest height Zchange by adding the retreated tool length Lavoid and the distance Zdown to the noninterference closest height reference value Zbase.

The noninterference closest height Zchange is calculated until the present machining process is finished, and is written to the M-S RAM 81. The next tool 3next selected as a machining condition in the next machining process is written to the M-S RAM 81 and also to the M-A RAM 82. The amount of movement or rotation of the work W is written to the M-S RAM 81. The data of the next tool 3next written to the M-S RAM 81 is used by the slave CPU 72, for example, to determine the rotational speed of the spindle from the pitch of the drill. The data of the next tool 3next written to the M-A RAM 82 is used by the ATC CPU 73 to calculate the amount of rotation of the magazine motor 31, for example, in indexing the tool.

Figure 10A:
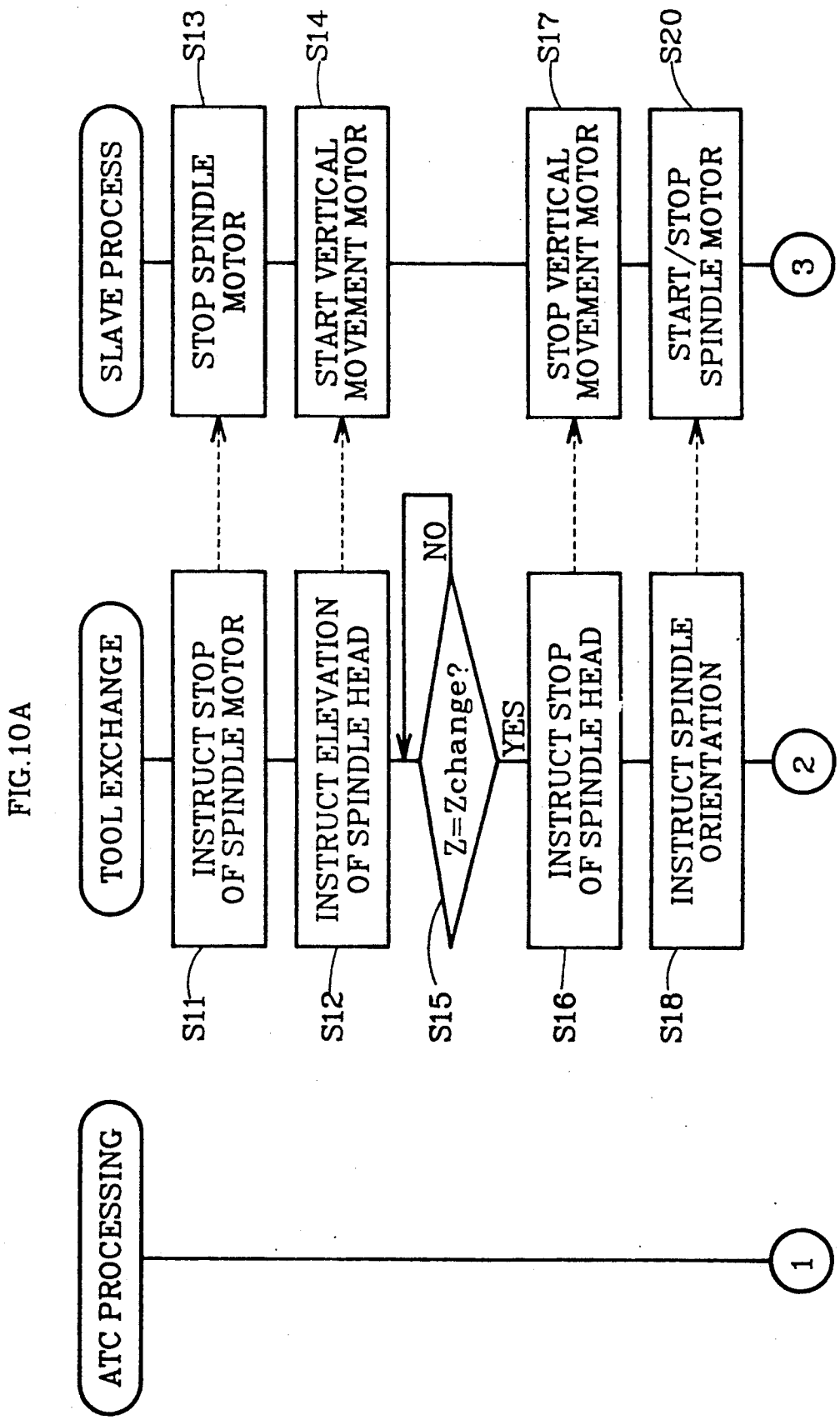

When the present step ends, the slave CPU 72 and the ATC CPU 73 read data from the M-S RAM 81 and the M-A RAM 82, respectively, and executes the tool exchange processing routine, as shown in the flowchart of FIG. 10. In FIG. 10, where instructions from the master CPU 71 are shown in the center, instructions from the slave CPU 72 are shown on the right side, and instructions from the ATC CPU 73 are shown on the left side.

When the present machining process ends, the master CPU 71 sends an instruction signal for stopping the spindle motor 23 at step S11, and an instruction signal for elevating the spindle head 5 at step S12. The slave CPU 72 receives the instruction signals from the master CPU 71, stops the spindle motor 23 at step S13, and starts the vertical movement motor 19 at step S14.

Subsequently, at step S15 the master CPU 71 refers to the value detected by the vertical position sensor 85, and determines whether the spindle head 5 has reached the noninterference closest height Zchange calculated in the processing in FIG. 9. If at step S15 the spindle head 5 has reached the noninterference closest height Zchange, at step S16 the master CPU 71 sends an instruction for stopping the spindle head 5 at step S16, and at step S17, the slave CPU 72 stops the vertical movement motor 19.

After the spindle head 5 has been placed in the noninterference closest height Zchange, step S18 instructs spindle orientation and step S19 instructs next tool indexing. At step S20 the slave CPU 72 starts or stops the spindle motor 23, thereby orientating the spindle 23. At step S21 the ATC CPU 73 starts or stops the magazine motor 31 to index the next tool 3next.

At step S22 the master CPU 71 awaits a tool indexing end signal from the ATC CPU 73 and sends out an instruction for preparing the tool for the next machining process. Upon receiving the instruction, at step S23 the ATC CPU 73 again starts or stops the rotating motor 41 to rotate the next tool 3next downward to the tool takeout axis C.

In the above, steps S18 through S23 are described successively. In practice, these steps can be executed in another order. Specifically, the slave CPU 72 executes step S20, and the ATC CPU 73 executes steps S21 and S23, respectively and independently. Since no interference occurs with the work W at the time of tool indexing, the tool can be indexed until the spindle head 5 completely retreats. Consequently, in operation, the timings are set such that immediately after the spindle head 5 completely retreats, steps S22 and S23 prepare the tool for the next machining process, thereby reducing operation time.

When the master CPU 71 receives from the ATC CPU 73 a signal indicating that the next tool 3next has been prepared, step S24 instructs the ATC CPU 73 to drive the tool exchange arm 9, and step S25 starts or stops the tool exchange motor 53. Therefore, when the cam shaft 51 once rotates, the tool exchange arm 9 grips, takes out, rotates, inserts and releases the present tool 3 and the next tool 3next. The tools are thus quickly exchanged.

Substantially simultaneously with the exchange of the tools, at step S26 the master CPU 71 instructs the slave CPU 72 to rotate the axis B and index the machined surfaces W1 through W4 for the next machining process, and step S27 starts or stops the B-axis motor 15b, thereby indexing the machined surfaces W1 through W4. If no change of the machined surface is instructed for the next machining process, neither step S26 nor S27 is carried out.

In the above steps S24 through S27 are described successively. Since steps S25 and S27 are independently executed by the slave CPU 72 and the ATC CPU 73, steps S25 and S27 can be simultaneously carried out. Steps S22 and S23 for preparing the next tool can be performed simultaneously with steps S26 and S27 for indexing the machined surface. In operation, therefore, soon after the spindle head 5 completely retreats at steps S11 through S17, the machined surface can be indexed at steps S26 and 27.

Subsequently, step S28 instructs the ATC CPU 73 to return the tool pot 29next from the tool takeout axis C to its original position, and step 29 starts or stops the rotating motor 41, thereby returning the tool pot 29next to its original position.

When the ATC CPU 73 sends a signal indicating that the tool pot 29next has been returned to its original position, step S30 instructs the slave CPU 72 to lower the spindle head 5, and step S31 starts the vertical movement motor 19 in reverse. When the head 5 subsequently goes down and the front end of the next tool 29next reaches the height at which it comes into contact with the machined surfaces W1 through W4 of the work W at step 32, the vertical movement motor 19 and the spindle motor 23 are driven while controlled according to the machining program and the machining of the work is initiated in the next machining process. Step S32 determines whether the interference height Zfix is reached. If at step S32 the spindle head 5 lowers until the tip of the next tool 29next contacts any machined surface W1 through W4, the vertical movement motor 19 and the spindle motor 23 are driven and controlled according to the machining program, thereby starting the next machining process.

As aforementioned, in the present embodiment, after the present machining process ends, the spindle head 5 quickly retreats to exchange the tools and to change the machined surface. At the same time, the position to which the spindle head 5 retreats is controlled to the closest retreat height Zheight calculated at steps S1 through S6. Therefore, neither of the tools 3 or 3next interferes with the work W. The spindle head 5 requires minimum time for retreating. Indirect operation time for exchanging the tools can be reduced greatly, and the work W can efficiently be machined.

Since the machining center 1 of the small integrated type requires minimum operation for efficiently machining the work W, the most advantageous use of the machining center 1 is made. At the same time, the machining center 1 occupies minimum space in a machining factory.

The spindle head 5, the tool magazine 7 and the tool exchange arm 9, which are formed into one piece, do not interfere with each other. Without considering such interference, the noninterference closest height Zchange can be calculated, and simple control can be executed with no error based on the value detected by the vertical position sensor 85. The spindle head 5 can thus securely retreat.

The tool magazine 7 is designed such that the tools are arranged along the magazine axis M perpendicular to the spindle 21. Immediately after the spindle head 5 completely retreats at steps S11 through S17, at step 22 the rotating arm 43 is rotated, the tool pot 29next is rotated downward, and the next tool 3next is prepared on the tool takeout axis C. The tools are thus exchanged quickly. Even when the next tool for the next machining process is much longer than the present tool for the present machining process, the next tool is prevented from being brought to the tool takeout position P2 and interfering with the work W before the spindle head 5 completely retreats. As a result, any type of the tools can be exchanged quickly.

As shown in FIG. 8B, the highest point of the locus of the work W is considered for the calculation of the noninterference closest height Zchange. Thus, once the spindle head 5 retreats, no interference with the work W occurs when the tools are exchanged or when the machined surface is changed. After the spindle head 5 completely retreats, the machined surface can be immediately changed irrespective of the progress in the exchange of the tools. If the tools are exchanged and, concurrently, the machined surface is changed, neither the tool 3 nor the tool 3next interferes with the work W. The preparations for the next machining process can thus quickly be made. Since the noninterference closest height Zchange is determined from the locus, the timing of the exchange of the tools need not be adjusted to that of the change of the machined surface. The exchange of the tools and the change of the machined surface can be individually executed and easily and securely controlled.

In the embodiment, the machining center 1 of the small integrated type is referred to. However, the machining center is not limited to the small integrated type. Separate drive sources can move the spindle head, the tool magazine and the tool exchange arm vertically. Since the spindle head, the tool magazine, and the tool exchange arm are retreated to the noninterference closest positions prior to the exchange of the tools, the tools can quickly be exchanged, thereby improving the efficiency of operation.

In the embodiment, the noninterference closest positions are calculated from the lengths of the tools. However, the thickness, the tip configuration, and other factors of the tools can be considered for such calculation. In addition, the locus of the rotated tools can be considered.

In order to reduce operation time, steps S19 and S21 for the indexing of the tools can be finished before the present machining process. The machined surface can start to be changed either before the spindle head 5 reaches the noninterference closest height Zchange or when the corner K1 or K4 of the work W reaches the height Z1-2 or Z1-4 at the change of the machined surface. Thus, operation time can be further reduced by thus more accurately controlling various timings.

The machined surface can be changed by moving the work W within the X-Y plane instead of the rotation of the work W about the axis B. The noninterference closest height Zchange can be calculated from the configuration and the machined position of the work W. Also, the exchange of the tools and the change of the machined surface can be performed at the same time, and the spindle head 5 retreats a minimum distance. Operation time can thus be reduced.

In the embodiment, whether the spindle head 5 has retreated is determined from an absolute position of the spindle head 5. An incremental sensor can also be used. Since the embodiment relies on the absolute position, it is unnecessary to determine to what extent the vertical movement motor 19 should be driven to retreat the spindle head 5 to its noninterference closest height Zchange. Thus calculation and control are easy.

In the embodiment, the spindle head 5 vertically moves. The work table 13 can be moved up and down instead.

The mechanical and electric structure of a machining center for another embodiment is the same as that for the aforementioned embodiment. In this second embodiment, an indexing device is explained in detail.

As shown in FIG. 2, a base 2 is provided with a table 14, as well as the column 11. The table 14 can be moved within a horizontal plane along X and Y axes by the X-axis motor 13a and the Y-axis motor 13b. The indexing device 12, as a machined surface change means mounted on the table 14, includes the indexing table 15. As shown in FIG. 6, the work W can be installed on the indexing table 15 and rotated a desired angle about the axis B perpendicular to the axis of the spindle 21 by the B-axis motor 15b in the indexing device 12.

In operation, the B-axis motor 15b rotates the work W set on the indexing table 15 about the axis B to index the machined surface of the work W. During or prior to the machining of the work W, the work W is positioned on the table 14, the vertical movement motor 19 vertically moves the spindle 21, and the X-axis motor 13a and Y-axis motor 13b drive the table 14. After the vertical movement motor 19 moves the spindle 21 vertically to move the tool 3 attached to the front end of the spindle 21 away from the work W, the indexing device 12 rotates the work W, thus preventing any interference with the work W.

In the second embodiment, the machining of the work with plural surfaces to machine is explained. If necessary, the indexing device 12 can be changed according to the kind of the work. In the second embodiment the tool 3 is not replaced throughout the whole machining process.

When the direction or the angle of the rotation is limited according to the shape of the work to be machined, or if the direction or the angle of the rotation of the indexing device 12 is limited according to the kind of the indexing device 12 or its connected cable, such limitations are previously entered through the keyboard 83 and stored into given addresses of the second master RAM 76.

When the work W is rotated clockwise or counterclockwise to bring a machined surface adjacent to the presently indexed machined surface of the work W into the position of the presently indexed surface, the tool 3 is moved the least distance without interfering with the work W or other components. The positions assumed in this operation are stored in the second master RAM 76. Specifically, the surface opposed to the spindle 21 is changed from an arbitrary machined surface of the work W to either adjacent machined surface by rotating the work W about the axis B by means of the indexing device 12. Within the range of the rotation, the work W is brought closest to an interference region, in which the tool 3 interferes with a peripheral device such as the table 14 and the work W, without entering the interference region. The closest positions are hereinafter referred to as the noninterference closest positions, which are previously entered through the keyboard 83 and stored in the given addresses of the second master RAM 76.

Figure 11A:
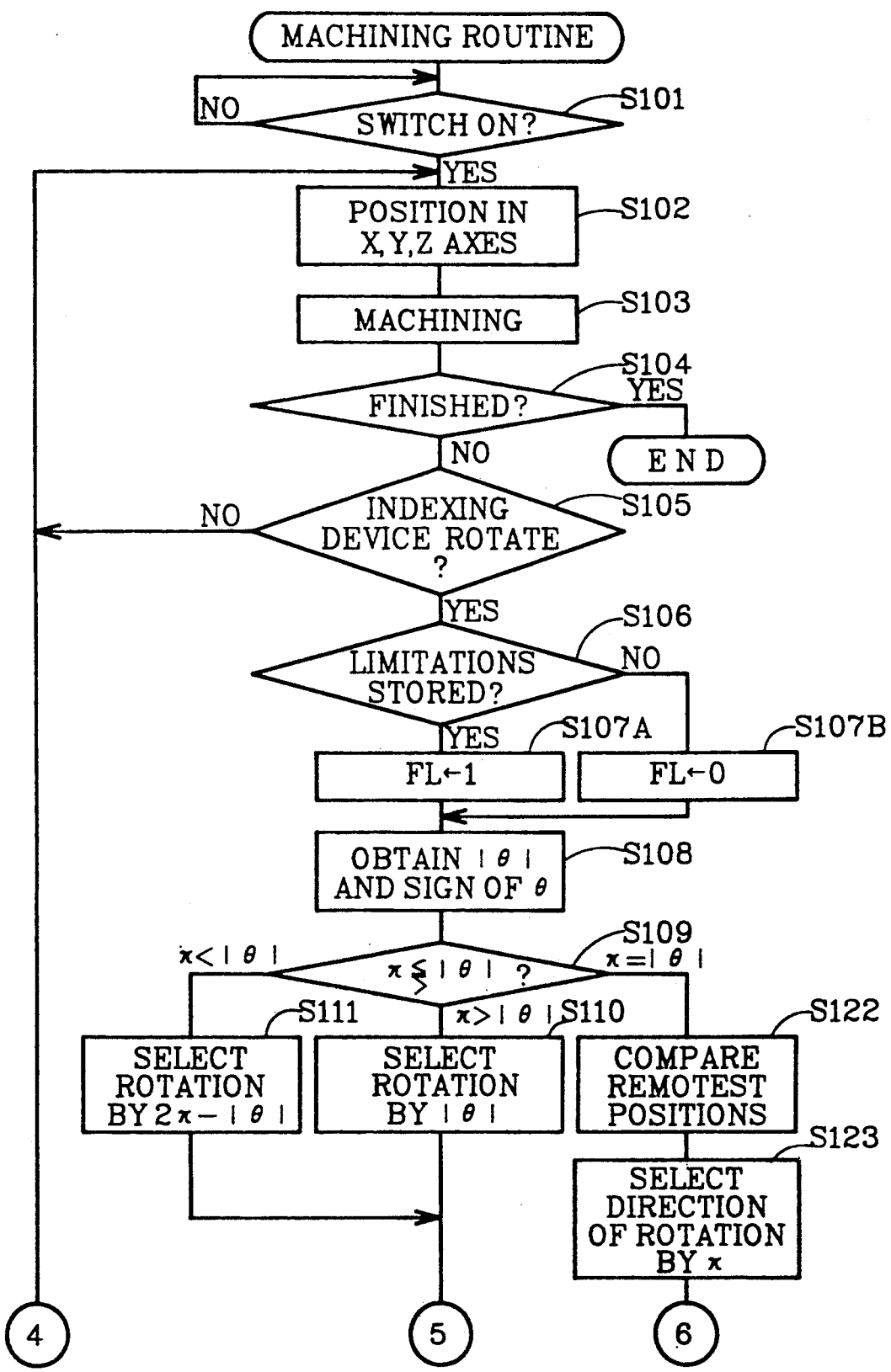

A machining program is also entered through the keyboard 83 and stored in the second master RAM 76. In the machining program, the angular position of the work W about the axis B is represented by an absolute value. After entering the data as aforementioned, a main routine for machining is executed as shown in the flowchart of FIG. 11.

First, step S101 determines whether an actuating switch (not shown) is turned on. If at step S101 the actuating switch is off, the process waits until the actuating switch is turned on. If at step S101 the actuating switch is on, step S102 positions the work in the X, Y, and Z axis directions relative to the tool 3 at the front end of the spindle head 5. Subsequently, step S103 machines the work according to the machining program. Step S104 determines whether the machining of the work is finished. If at step S104 the machining of the work is completed, the process ends. If at step S104, the machining of the work is not yet finished, step S105 determines whether the next operation involves the rotation by the indexing device 12. If at step S105 the next operation does not involve such rotation, the process goes back to step S102, and steps S102 through S105 are repeated.

If at step S105 the rotation is involved, step S106 determines whether the limitations on the direction and the angle of the rotation of the work and the indexing device 12 are stored in the second master RAM 76. If at step S106 the limitations are stored, at step S107A a flag FL is set to one. If at step S106 the limitations are not stored, at step S107B the flag FL is reset to zero. Subsequently, the process goes to step S108, where an angular difference $\theta$ is calculated by subtracting the present angular position from the angular position for the next step. The angular positions are represented by absolute values. Step S108 determines whether the sign of the angular difference $\theta$ is negative or positive, and obtains an absolute value $|\theta|$ of the angular difference $\theta$. Step S109 determines whether the absolute value $|\theta|$ is less than, equal to, or greater than $\pi$.

If at step S109 the absolute value $|\theta|$ is less than $\pi$, at step S110 the master CPU 71 selects a nearer rotation by $|\theta|$ in the same direction as the sign determined at step S108. If at step S109 the absolute value $|\theta|$ exceeds $\pi$, step S111 selects a rotation by $2\pi-|\theta|$ in the opposite direction to the sign determined at step S108. Subsequently, step S112 determines whether the flag FL is set to one or not. If at step S112 the flag FL is set to one, step S113 determines whether the rotation selected at steps S110 or S111 is within the previously stored range of limitations. If the limitations do not permit the selected rotation, step S114 changes the selected rotation to a farther rotation by [$2\pi$-(the angle of rotation selected at step S110 or S111)] in the direction opposite to the one selected at step S110 or S111. If at step S112 the flag FL is reset to zero, or if at step S113 the rotation selected at step S110 or S111 lies within the range of the limitations, the process goes to step S115. Specifically, the direction of rotation takes the shorter route when the limitations permit the rotation, the direction takes the longer route when the rotation is not in the limitations.

Step S115 compares the noninterference closest positions previously input from the keyboard 83 and corresponding to the rotation selected or changed at step S110, S111 or S114, and selects the position with the largest value of the noninterference closest position as the remotest position. Step S116 moves the spindle head 5 by the vertical movement motor 19 into the remotest position selected at step S115. At step S117 the sign of the direction of rotation selected at step S110 or S111 or changed at step S114, and the absolute value of the angular position reached for the next machining process are displayed in a first area on the CRT 84. At step S118 the indexing device 12 turns the work about the axis B according to the displayed direction of rotation and reached angular position, so that the next machined surface may face the spindle 21. When the work rotates, the tool 3 does not interfere with the work or other component, but is closest to the work, because step S116 has moved the spindle head 5 to the remotest position.

Step S119 determines whether the flag FL is set to one or not. If at step S119 the flag FL is set to one and the limitations are stored in the second master RAM 76, step S120 provides a linear display within the range $2N\pi(N=3)$ in a second region on the CRT 84 to show the distance of the angular position of the indexed work from the initial angular position. It is displayed how many degrees in total the work rotates in the positive or negative direction to reach the angular position. If at step S119 the flag FL is reset to zero and no limitations are stored, step S121 displays the angular position of the indexed work within the range from $-2\pi$ to $+2\pi$. The process goes back to step S102, and steps S102 and the subsequent steps are repeated.

If at step S109 the absolute value $\theta$ of the angular difference is equal to $\pi$, at step S122 the remotest position of the noninterference closest positions within the angular range of $+\pi$ is compared with the remotest position of the noninterference closest positions within the angular range of $-\pi$ at step S122. Step S123 selects the direction of the rotation of the work with a shorter distance from the remotest position and by the angle of $\pi$. Step SS similar to steps S112 through S122 are carried out, thereby rotating the work about the axis B and displaying the direction and the angle of the rotation. The process goes back to step S102, and step S102 and the subsequent steps are repeated.

Figure 12:
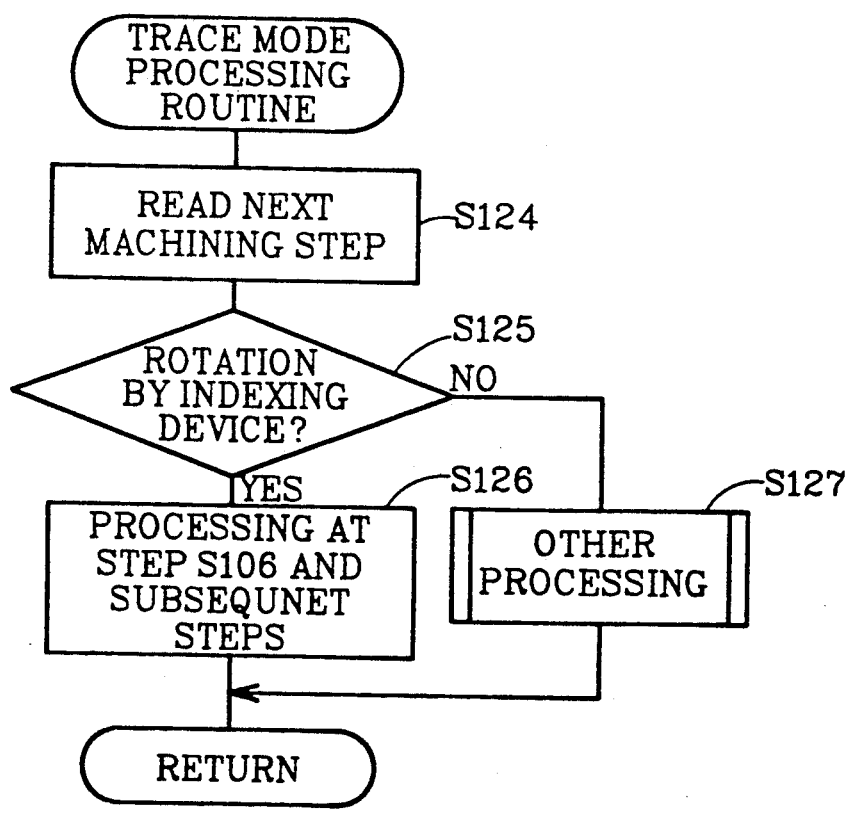
FIG. 12 is a flowchart illustrating a routine for trace mode processing.

As aforementioned, when the actuating switch is turned on, the machining process is automatically executed. When the steps of the machining process are executed intermittently, a trace mode processing routine shown in the flowchart of FIG. 12 is executed by pressing a manual switch (not shown).

First, at step S124 the second master RAM 76 reads the next machining process. Step S125 determines whether the work is rotated about the axis B by the indexing device 12. If at step S125 the work is rotating, step 26 executes operations at the step S106 and the subsequent steps in FIG. 11. If at step S125 the work is not rotated, step S126 executes other processing. The process returns to standby condition.

In the second embodiment, the work is rotated by the indexing device 12 to take the shorter route so that the next machined surface can be machined in the next machining process. The spindle 21 is moved such that the tool 3 does not interfere with the work or the peripheral device such as the table 14 and the tool 3 moves the minimum distance. The work can quickly be machined.

When the limitations due to the shape of the work and other factors do not permit the work to take the shorter route, the work is rotated in reverse by the indexing device 12. The work is thus prevented from contacting the table 14 or other component. The cable connected to the indexing device 12 or the table 14 is also prevented from being damaged.

As aforementioned, the tool 3 moves a minimum distance, and the limited rotation of the work is avoided, based on the data previously entered through the keyboard 83. Consequently, when the machining program is arranged, steps for avoiding the limited rotation of the work need not be considered. The machining program can easily be prepared, and need not be modified.

The angular position is represented by an absolute value in the machining program. However, the next direction of the rotation of the work is displayed in the first region on the CRT 84. Since the operator can confirm the direction of the rotation on display, the work can be safely machined. When every step of the machining process is manually checked according to the flowchart of FIG. 12, if the spindle 21 is moved to an arbitrary position, not based on the program, to check the work before the work is rotated by the indexing device 12, the position of the spindle 21 can easily be readjusted. The spindle 21 can be readjusted such that the spindle head 5 should not interfere with the work rotated in the known direction. Since the correct direction of rotation is known, the tool 3 is prevented from interfering with the work because of error.

When limitations are applied to the rotation of the work made by the indexing device 12, the display mode is automatically to the linear mode in which the angular position of the indexed work is displayed linearly. The operator can know how many times the work rotated from the beginning to reach the present position. For example, when the machining process is manually checked step by step, the operator need not switch the display mode between the linear display and the angular display before the work is rotated. The work can be rotated without overstroke.

In the embodiment, the work is machined without exchanging the tool 3 by the tool exchange arm 9. When the tool 3 is exchanged by the tool exchange arm 9 during the machining process, the noninterference closest positions can be determined from the length of the present tool 3 and the next tool 3next and the vertical travel distance of the tool exchange arm 9 at the time of the exchange of the tools. The determined noninterference closest positions can be stored in the second master RAM 76. The aforementioned advantages can be expected during the machining process involving the exchange of the tools. The machining process can be quickly carried out for wide application.

In the second embodiment, when $\theta$ calculated at step S109 is equal to $\pi$, the direction of rotation is selected such that the spindle head 5 retreats minimum distance. However, the work can be rotated in a fixed direction every time $\theta$ is equal to $\pi$.

Every angular position of the work within the range from 0 to $2\pi$ can be substantially continuously stored in the second master RAM 76 as the noninterference closest positions. The manner for storing data can be varied appropriately. In the second embodiment, the display of the second region on the CRT 84 is switched between linear display and angular display. The angular position of the machined surface for the next machining process can be shown in the second region on the CRT 84.

In the second embodiment, the display of the direction of the rotation of the work can be omitted. If no limitations are placed on the rotation of the work driven by the indexing device 12, the function of determining whether limitations exist or not can be omitted.

This invention has been described above with reference to the preferred embodiment. Modifications and alterations may become apparent to one skilled in the art upon reading and understanding the specification. It is intended to include all such modifications and alterations within the scope of the appended claims.

What is claimed is:

1. A numerically controlled machine tool, comprising:
    a spindle head for supporting a spindle such that the spindle is rotatable about a first axis;
    a tool magazine for accommodating tools;
    a tool detachably attached to the spindle such that the tool rotates with the spindle about the first axis;
    tool exchange means for exchanging the tool attached to the spindle with the tool accommodated in the tool magazine, the tool exchange means being formed integrally with the spindle head and the tool magazine;
    a table for supporting a work piece such that the tool may contact and machine the work piece;
    a frame for supporting the spindle head and table to allow relative movement between the spindle head and the table along the first axis;
    change distance calculation means for calculating a change distance between the spindle head and the table based on at least a length of the tool in the spindle and the size of the work piece and including means that detect the length of the tool and the size of the workpiece, and drive means, operatively associated with said change distance calculation means, for changing the distance along the first axis between the spindle head and the table such that the distance from the spindle head to the table is equal to the change distance.

2. The numerically controlled machine tool of claim 1, in which the change distance is the minimum distance necessary for relative movement between the tool in the spindle and the work piece when the tool is not machining the work piece without allowing the tool and work piece to contact during the relative movement.

3. A numerically controlled machine tool, comprising:
    a spindle head for supporting a spindle such that the spindle is rotatable about a first axis;
    a tool detachably attached to the spindle such that the tool rotates with the spindle about the first axis;
    a table for supporting a work piece such that the tool may contact and machine the work piece;
    a frame for supporting the spindle head and table to allow relative movement between the spindle head and the table along the first axis;
    change distance calculation means for calculating a change distance between the spindle head and the table based on the size of the work piece and the longer of the length of the tool in the spindle or the length of the tool in the tool exchange position, the change distance being the minimum distance necessary for relative movement between the tool in the spindle and the work piece when the tool is not machining the work piece without allowing the tool and the work piece to contact during the relative movement;
    drive means, operatively associated with said change distance calculation means, for changing the distance along the first axis between the spindle head and the table such that the distance from the spindle head to the table is equal to the change distance;
    a tool magazine supported on a side of the spindle head, where the tool magazine rotates about a second axis orthogonal to the first axis;
    a plurality of tool holding means, located on an outer periphery of the tool magazine, for holding tools, where, by rotating the tool magazine about the second axis, any of the tools in the plurality of tool holding means may be moved into a tool exchange position;
    tool exchange means, supported on the spindle head such that the tool exchange means rotates about and moves along a third axis parallel to the first axis, for exchanging a tool in the tool magazine for a tool in the spindle;
    the drive means changing the distance between the spindle head and the table before the tool exchange means exchanges the tool in the tool exchange position for the tool in the spindle; and
    control means for controlling the tool magazine and the tool exchange means by generating a magazine rotation instruction prior to generating a tool exchange instruction, where the magazine rotation instruction instructs the tool magazine to rotate such that a next desired tool is placed in the tool exchange position, and the tool exchange instruction instructs the tool exchange means to exchange the tool in the tool exchange position for the tool in the spindle when the distance between the spindle head and the table equals the change distance.

4. The numerically controlled machine tool of claim 2, further comprising:
    a tool magazine supported on a side of the spindle head, where the tool magazine rotates about a second axis orthogonal to the first axis;
    a plurality of tool holding means, located on an outer periphery of the tool magazine, for holding tools, where, by rotating the tool magazine about the second axis, any of the tools in the plurality of tool holding means may be moved into a tool exchange position;
    tool exchange means, supported on the spindle head such that the tool exchange means rotates about and moves along a third axis parallel to the first axis, for exchanging a tool in the tool magazine for a tool in the spindle; wherein
    the change distance calculation means further calculates the change distance based on a length of the tool in the tool exchange position; and
    the drive means changes the distance between the spindle head and the table before the tool exchange means exchanges the tool in the tool exchange position for the tool in the spindle.

5. The numerically controlled machine tool of claim 4, in which the change distance calculation means calculates the change distance based on the size of the work piece and the longer of the length of the tool in the tool exchange position or the length of the tool in the spindle.

6. The numerically controlled machine tool of claim 5, further comprising control means for controlling the tool exchange means by generating a tool exchange instruction when the distance between the spindle head and the table equals the change distance, where the tool exchange instruction instructs the tool exchange means to exchange the tool in the tool exchange position for the tool in the spindle.

7. The numerically controlled machine tool of claim 3, further comprising control means for controlling the drive means and relative movement between the tool and the work piece, where the control means controls the drive means to increase the distance between the spindle head and the table before the control means allows relative movement between the tool and the work piece.

8. The numerically controlled machine tool of claim 7, in which the table further comprises:
    work piece indexing means mounted on the table for holding the work piece and rotating the work piece about a fourth axis orthogonal to a plane including the first axis; and the numerically controlled machine tool further comprises:
    a drive control means for controlling said workpiece indexing means, said drive control means preventing rotation of the work piece indexing means about the fourth axis while the relative distance between the spindle head and the table is less than the change distance.

9. The numerically controlled machine tool of claim 8, further comprising control means for controlling the work piece indexing means by generating a work piece rotation instruction when the distance between the spindle head and the table equals the change distance, where the work piece rotation instruction instructs the work piece indexing means to rotate the work piece such that a surface of the work piece to machine may be machined by the tool.

10. A numerically controlled machine tool, comprising:
- a spindle head for supporting a spindle such that the spindle is rotatable about a first axis;
- a tool detachably attached to the spindle such that the tool rotates with the spindle about the first axis;
- a table for supporting a work piece such that the tool may contact and machine the work piece;
- a frame for supporting the spindle head and table such that the spindle head moves relative to the table along the first axis;
- a tool magazine for accommodating tools supported on a side of the spindle head, where the tool magazine rotates about a second axis orthogonal to the first axis;
- a plurality of tool holding means, located on an outer periphery of the tool magazine, for holding tools, where, by rotating the tool magazine about the second axis, any of the tools in the plurality of tool holding means may be moved into a tool exchange position;
- tool exchange means, integrally formed with and supported on the spindle head and the tool magazine such that the tool exchange means rotates about and moves along a third axis parallel to the first axis, for exchanging a tool accommodated in the tool magazine for a tool attached to the spindle;
- tool exchange distance calculation means for calculating a tool exchange distance based on parameters of a tool in the tool exchange position, a tool in the spindle, and the work piece and including means that detect the size of the tool and the size of the workpiece; and
- drive means, operatively associated with said tool exchange distance calculation means, for moving the spindle head along the first axis relative to the table such that the spindle head is the tool exchange distance away from the table before the tool exchange means exchanges the tool in the tool exchange position for the tool in the spindle.

11. The numerically controlled machine tool of claim 10, in which the tool exchange distance calculation means calculates the tool exchange distance based on the size of the work piece and the longer of the length of the tool in the tool exchange position or the length of the tool in the spindle.

12. The numerically controlled machine tool of claim 11, further comprising control means for controlling the tool exchange means by generating a tool exchange instruction when the distance between the spindle head and the table equals the tool exchange distance, where the tool exchange instruction instructs the tool exchange means to exchange the tool in the tool exchange position for the tool in the spindle.

13. The numerically controlled machine tool of claim 12, in which the control means further controls the tool magazine by generating a magazine rotation instruction before generating the tool exchange instruction, where the magazine rotation instruction instructs the tool magazine to rotate such that a next desired tool is placed in the tool exchange position.

14. The numerically controlled machine tool of claim 11, in which the table further comprises:
- work piece indexing means mounted on the table for holding the work piece and rotating the work piece about a fourth axis orthogonal to a plane including the first axis; wherein
- the drive means changes the distance between the spindle head and the table before the work piece indexing means rotates the work piece about the fourth axis.

15. The numerically controlled machine tool of claim 14, further comprising control means for:
- controlling the work piece indexing means by generating a work piece rotation instruction when the distance between the spindle head and the table equals the change distance, where the work piece rotation instruction instructs the work piece indexing means to rotate the work piece such that a surface of the work piece to machine may be machined by the tool; and
- controlling the tool exchange means by generating a tool exchange instruction when the distance between the spindle head and the table equals the tool exchange distance, where the tool exchange instruction instructs the tool exchange means to exchange the tool in the tool exchange position for the tool in the spindle; wherein
- the drive means changes the distance between the spindle head and the table before the control means generates the work piece rotation instruction and the tool exchange instruction.

16. The numerically controlled machine tool of claim 15, in which the control means further generates a magazine rotation instruction before generating the tool exchange instruction, where the magazine rotation instruction instructs the tool magazine to rotate such that a next desired tool is placed in the tool exchange position.

* * * * *